US012733060B2

(12) United States Patent
Jang et al.

(10) Patent No.: US 12,733,060 B2
(45) Date of Patent: Sep. 8, 2026

(54) METHOD AND APPARATUS FOR DEACTIVATING AND ACTIVATING SECONDARY BASE STATION IN WIRELESS COMMUNICATION SYSTEM

(71) Applicant: Samsung Electronics Co., Ltd., Suwon-si (KR)

(72) Inventors: Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/026,016

(22) PCT Filed: Sep. 17, 2021

(86) PCT No.: PCT/KR2021/012887
§ 371 (c)(1),
(2) Date: Mar. 13, 2023

(87) PCT Pub. No.: WO2022/060189
PCT Pub. Date: Mar. 24, 2022

(65) Prior Publication Data

US 2023/0371109 A1 Nov. 16, 2023

(30) Foreign Application Priority Data

Sep. 18, 2020 (KR) ........................ 10-2020-0120349

(51) Int. Cl.
*H04W 76/20* (2018.01)
*H04B 17/318* (2015.01)
(Continued)

(52) U.S. Cl.
CPC .......... *H04W 76/20* (2018.02); *H04B 17/328* (2023.05); *H04W 76/19* (2018.02);
(Continued)

(58) Field of Classification Search
CPC .. H04B 7/06964; H04B 17/327; H04B 17/17; H04W 52/0235; H04W 76/20;
(Continued)

(56) References Cited

U.S. PATENT DOCUMENTS 11,368,206 B2 6/2022 Chen et al.
2017/0150405 A1 5/2017 Chiba et al.
(Continued)

FOREIGN PATENT DOCUMENTS

CN 111418254 A 7/2020
EP 4 287 755 A1 12/2023
(Continued)

OTHER PUBLICATIONS

3GPP; 3rd Generation Partnership Project; TSG Radio Access Network; Evolved Universal Terrestrial Radio Access (EUTRA) and Evolved Universal Terrestrial Radio Access Network (E-UTRAN); Overall description; Stage 2 (Release 16), 3GPP TS 36.300 V16.2.0; Jul. 2020.

(Continued)

*Primary Examiner* — Sulaiman Nooristany
(74) *Attorney, Agent, or Firm* — Jefferson IP Law, LLP

(57) ABSTRACT

The present disclosure relates to: a communication technique for merging IoT technology with a 5G communication system for supporting a data transmission rate higher than that of a 4G system; and a system therefor. The present disclosure relates to a method performed by a terminal in a wireless communication system, and may comprise the steps of: receiving a deactivation command regarding a secondary cell group (SCG) from a first base station related to a master cell group (MCG); performing measurement on at least one beam related to the SCG, in a deactivated state regarding the SCG; and performing a random access with a second base station related to the SCG, on the basis of a random access
(Continued)

preamble related to a downlink beam, when beam failure is detected on the basis of the measurement.

16 Claims, 13 Drawing Sheets

(51) Int. Cl.
*H04W 76/19* (2018.01)
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ............. H04W 36/0069; H04W 76/15; H04W 36/085; H04W 76/27; H04W 36/305; H04L 5/0098
See application file for complete search history.

(56) References Cited

U.S. PATENT DOCUMENTS

| | | | |
|---|---|---|---|
| 2018/0054834 A1 | 2/2018 | Lee et al. | |
| 2019/0090227 A1 | 3/2019 | Tsai et al. | |
| 2019/0098520 A1 | 3/2019 | Kim | |
| 2019/0253941 A1 | 8/2019 | Cirik et al. | |
| 2020/0008262 A1 | 1/2020 | Dinan | |
| 2020/0022215 A1 | 1/2020 | Takahashi et al. | |
| 2021/0159967 A1* | 5/2021 | Cirik | H04L 5/001 |
| 2021/0274587 A1 | 9/2021 | Jung et al. | |
| 2022/0046522 A1 | 2/2022 | Kim et al. | |
| 2022/0394583 A1* | 12/2022 | Deenoo | H04W 36/305 |

FOREIGN PATENT DOCUMENTS

| | | | | |
|---|---|---|---|---|
| KR | 10-2019-0033015 A | 3/2019 | | |
| KR | 10-2019-0143782 A | 12/2019 | | |
| KR | 10-2022-0017735 A | 2/2022 | | |
| WO | 2019/184629 A1 | 10/2019 | | |
| WO | 2020/033542 A1 | 2/2020 | | |
| WO | WO-2022027543 A1 * | 2/2022 | | H04W 24/00 |

OTHER PUBLICATIONS

Extended European Search Report dated Feb. 15, 2024, issued in European Application No. 21869811.6-1215.
Indian Office Action dated Apr. 30, 2024, issued in Indian Application No. 202337017681.
Chinese Office Action dated Dec. 25, 2025, issued in Chinese Application No. 202180076233.8.
ZTE Corporation et al., Framework of SCG deactivation and activation, R2-2006900, 3GPP TSG-RAN WG2 Meeting #111, Aug. 7, 2020.
Chinese Office Action dated Jul. 22, 2025, issued in Chinese Patent Application No. 202180076233.8.
Huawei et al., RLF for NR, R2-1706745, 3GPP TSG-RAN WG2-NR Adhoc#2, Qingdao, China, Jun. 17, 2017.
Chinese Notice of Allowance dated Mar. 23, 2026, issued in Chinese Application No. 202180076233.8.

* cited by examiner

FIG. 1D

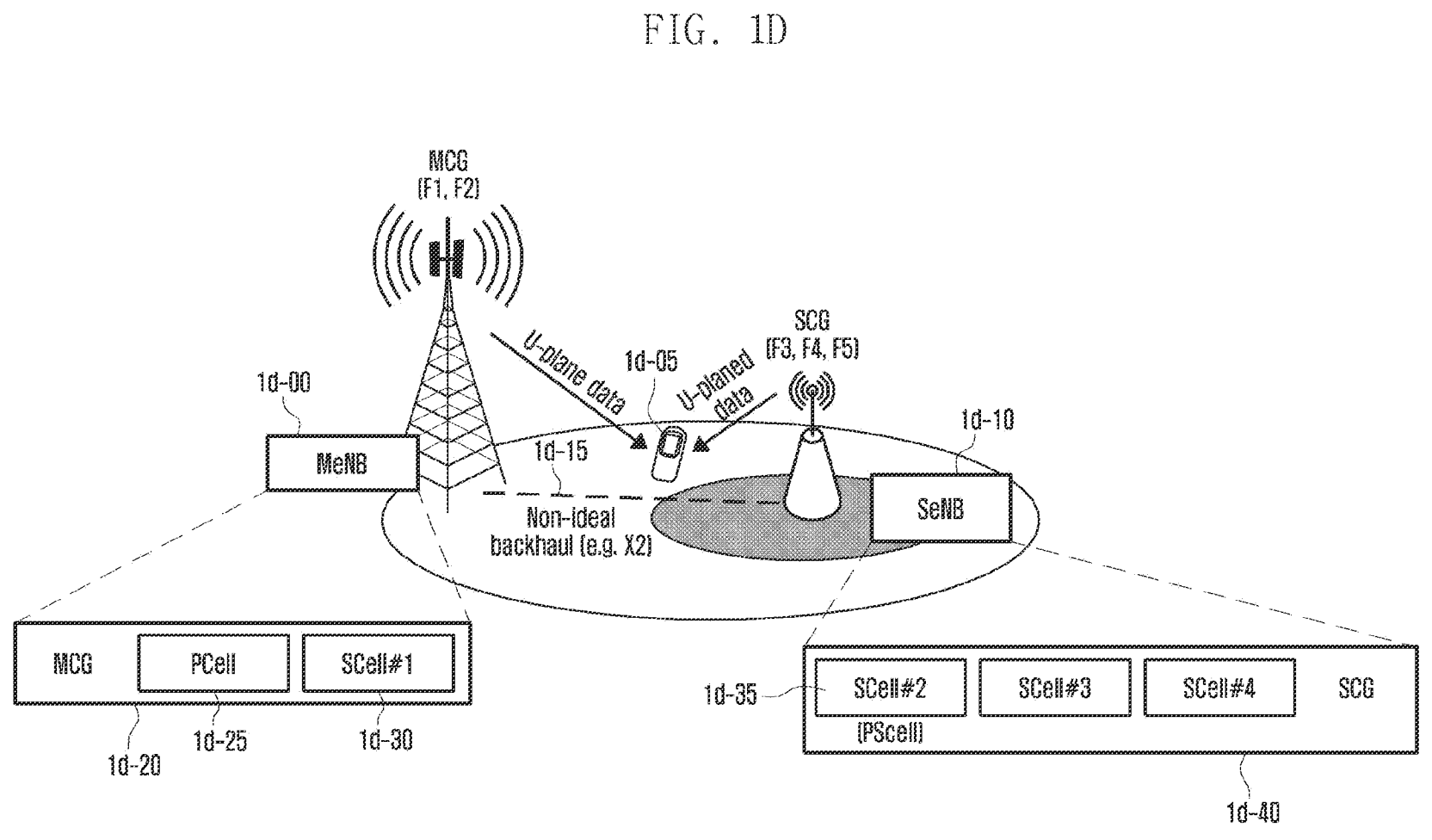

MCG
(F1, F2)
MeNB
1d-00
U-plane data
1d-05
U-plane data
SCG
(F3, F4, F5)
SeNB
1d-10
1d-15
Non-ideal
backhaul (e.g. X2)
MCG
PCell
SCell#1
1d-20
1d-25
1d-30
SCell#2
(PScell)
SCell#3
SCell#4
SCG
1d-35
1d-40

Figure 1G:
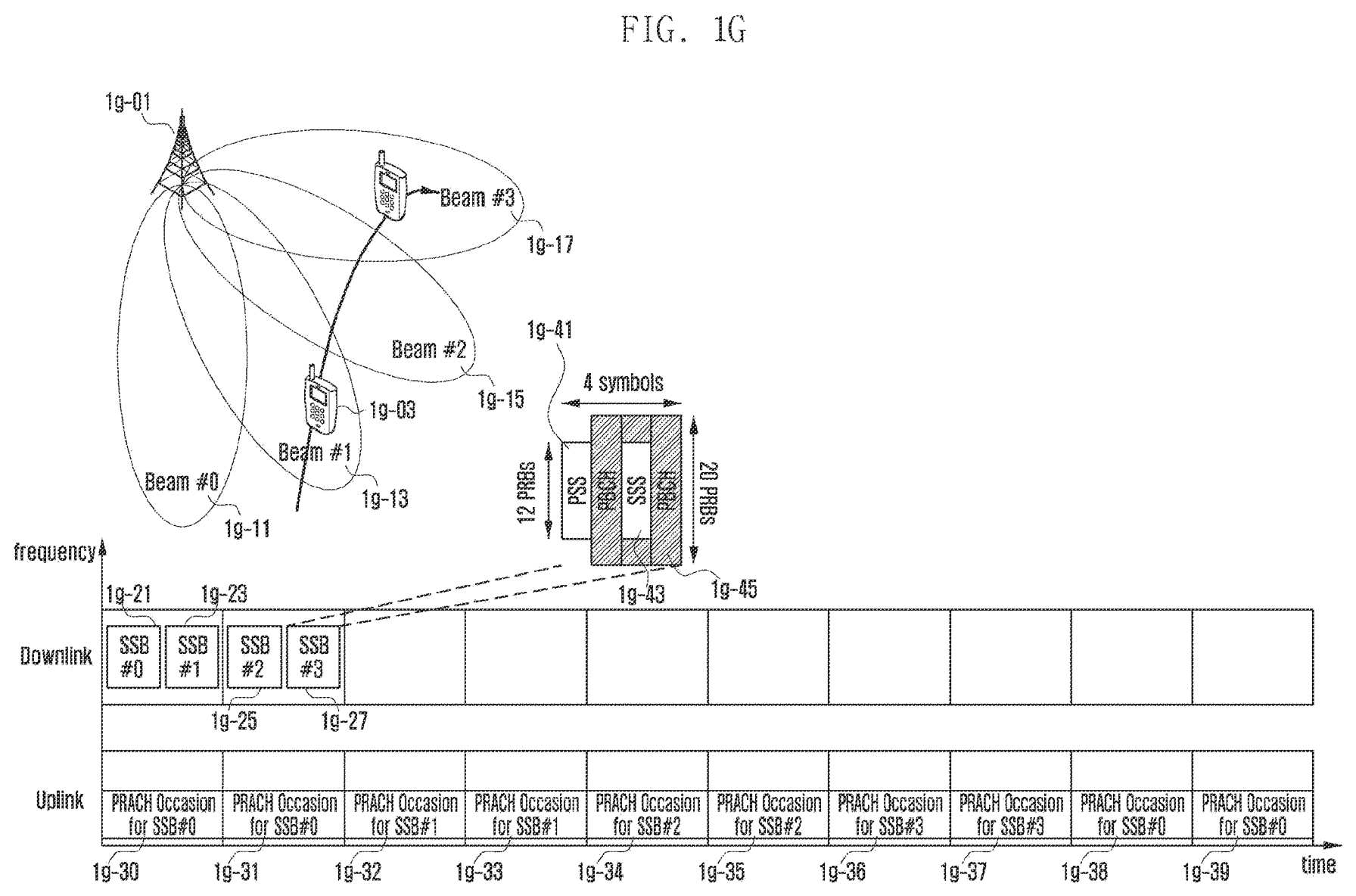

FIG. 1G 1g-01
1g-03
Beam #0
1g-11
Beam #1
1g-13
Beam #2
1g-15
Beam #3
1g-17
frequency
Downlink
Uplink
time
SSB #0
1g-21
SSB #1
1g-23
SSB #2
1g-25
SSB #3
1g-27
PSS
SSS
PBCH
PBCH
1g-41
1g-43
1g-45
12 PRBs
20 PRBs
4 symbols
PRACH Occasion for SSB#0
1g-30
PRACH Occasion for SSB#0
1g-31
PRACH Occasion for SSB#1
1g-32
PRACH Occasion for SSB#1
1g-33
PRACH Occasion for SSB#2
1g-34
PRACH Occasion for SSB#2
1g-35
PRACH Occasion for SSB#3
1g-36
PRACH Occasion for SSB#3
1g-37
PRACH Occasion for SSB#0
1g-38
PRACH Occasion for SSB#0
1g-39

FIG. 1H

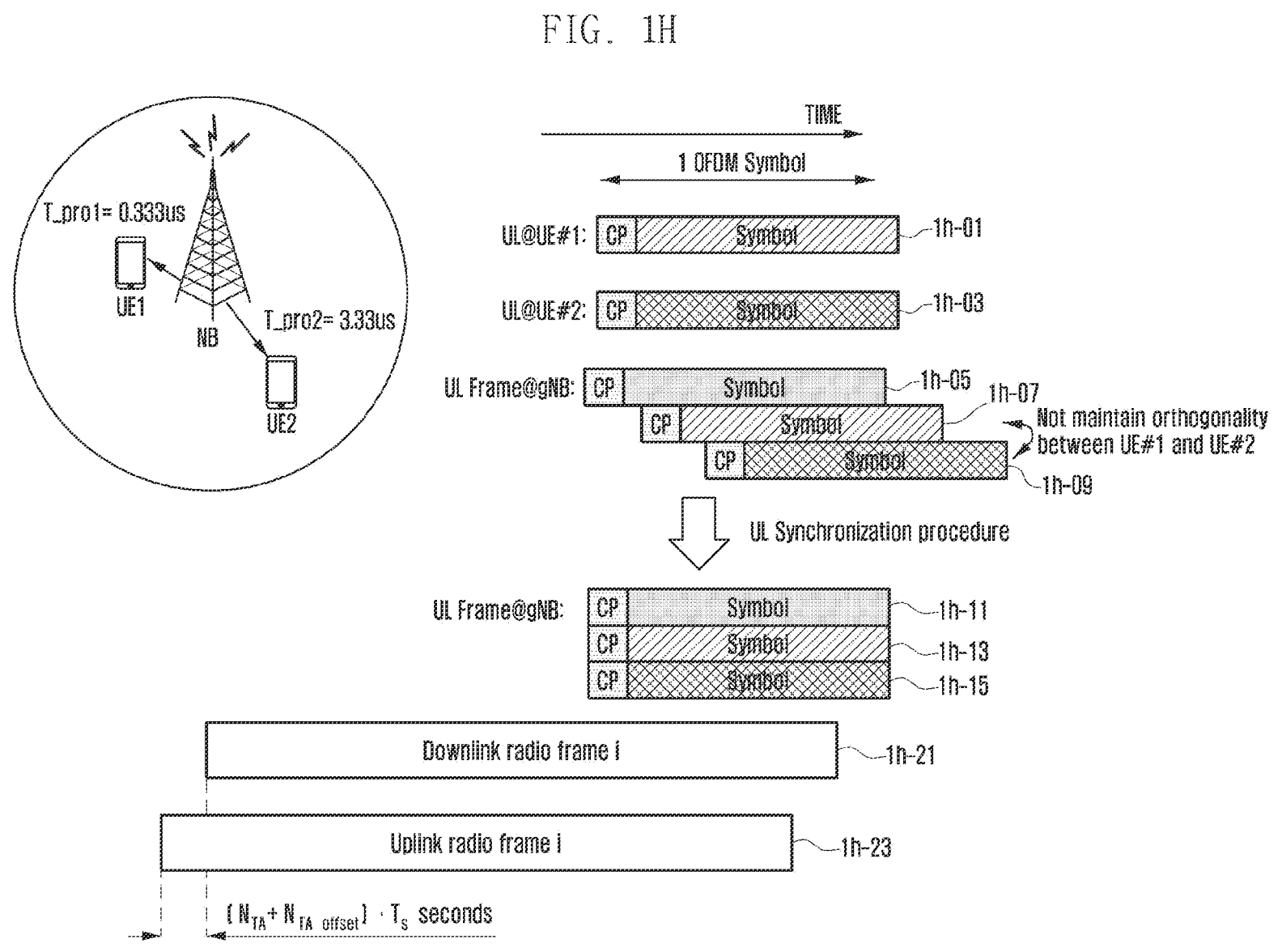

T_pro1= 0.333us
T_pro2= 3.33us
NB
UE1
UE2

TIME
1 OFDM Symbol
UL@UE#1: CP Symbol 1h-01
UL@UE#2: CP Symbol 1h-03
UL Frame@gNB: CP Symbol 1h-05 CP Symbol 1h-07 CP Symbol 1h-09
Not maintain orthogonality between UE#1 and UE#2
UL Synchronization procedure
UL Frame@gNB: CP Symbol 1h-11 CP Symbol 1h-13 CP Symbol 1h-15
Downlink radio frame i 1h-21
Uplink radio frame i 1h-23
$(N_{TA} + N_{TA\ offset}) \cdot T_S$ seconds

METHOD AND APPARATUS FOR DEACTIVATING AND ACTIVATING SECONDARY BASE STATION IN WIRELESS COMMUNICATION SYSTEM

TECHNICAL FIELD

The disclosure relates to a method for using dual connectivity (DC) in a wireless communication system. More particularly, the disclosure relates to a method for, when simultaneously using a master base station (master gNB or master cell group (MCG)) and a secondary base station (secondary gNB or secondary cell group (SCG)) in DC, deactivating the SCG and reactivating the SCG.

BACKGROUND ART

Since the commercialization of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems are being considered for implementation in the extremely high frequency (mmWave) band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. Additionally, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (COMP), interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IOT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs as a big data processing technique described above may be an instance of convergence of 5G technology and IoT technology.

With the recent advancement of wireless communication technology, research is being actively conducted on dual connectivity (DC) in wireless communication systems, and particularly in this dual connectivity technology, there may be a problem regarding deactivating and re-activating a secondary cell group (SCG). As such, a method and apparatus for smoothly operating the mobile communication system are required.

DISCLOSURE OF INVENTION

Technical Problem

Based on the above-described discussions, the disclosure proposes a method for a terminal to manage uplink timing for a secondary cell group (SCG) deactivated in a wireless communication system, a method for detecting and recovering a beam failure, and a method for activating the SCG again.

Solution to Problem

To solve the above problems, a method performed by a terminal of the disclosure may include: receiving a deactivation command for a secondary cell group (SCG) from a first base station associated with a master cell group (MCG); performing, in a deactivated state of the SCG, measurements on at least one beam related to the SCG; and performing, in case that a beam failure is detected based on the measurements, random access to a second base station associated with the SCG based on a random access preamble related to a downlink beam.

Further, a terminal of the disclosure may include at least one transceiver; and at least one processor, wherein the at least one processor may be configured to: receive a deactivation command for a secondary cell group (SCG) from a first base station associated with a master cell group (MCG); perform, in a deactivated state of the SCG, measurements on at least one beam related to the SCG; and perform, in case that a beam failure is detected based on the measurements, random access to a second base station associated with the SCG based on a random access preamble related to a downlink beam.

Advantageous Effects of Invention

The apparatus and method according to embodiments of the present disclosure may enable, when the master cell group (MCG) reactivates a deactivated secondary cell group (SCG) for a terminal, the terminal to manage valid uplink timing and valid beams for the corresponding SCG, thereby reducing latency.

In addition, the apparatus and method according to embodiments of the disclosure may enable, even when the SCG is in a deactivated state, the terminal to run and monitor the time alignment timer (TAT) associated with the SCG, thereby reducing uplink transmission delay when the SCG is reactivated.

Further, the apparatus and method according to embodiments of the disclosure may enable the terminal to perform beam failure detection (BFD) and beam failure recovery (BFR) when the SCG is in a deactivated state, thereby reducing downlink transmission delay when the SCG is reactivated.

BRIEF DESCRIPTION OF DRAWINGS

FIG. 1D is a diagram for explaining the concept of multi-connectivity in LTE and NR.

FIG. 1G is an illustrative diagram of frame structures for downlink and uplink channels when beam-based communication is performed in an NR system.

FIG. 1H is a diagram illustrating the necessity and role of an uplink timing synchronization procedure in a system to which orthogonal frequency division multiplexing (OFDM) is applied.

MODE FOR THE INVENTION

Figure 1A:
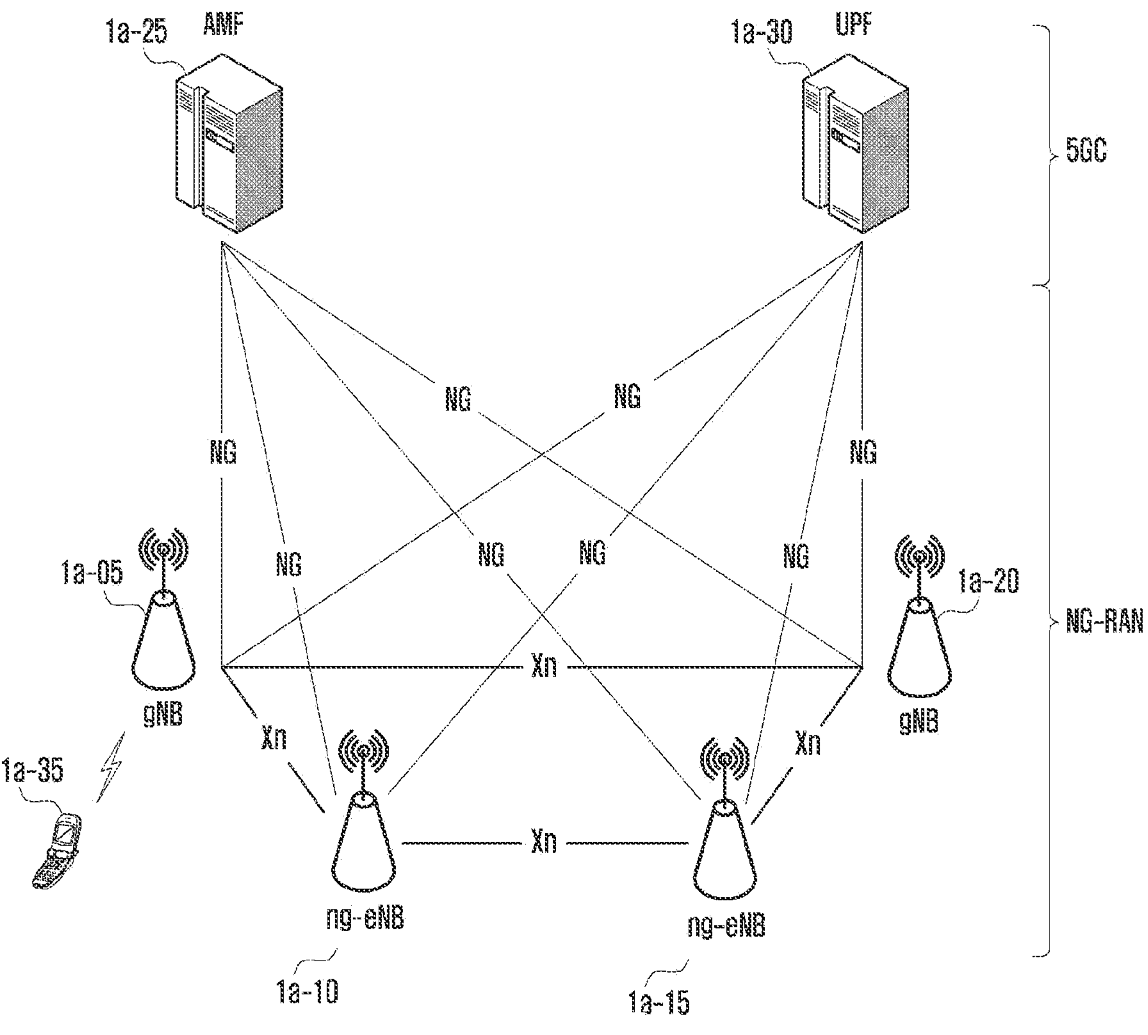
FIG. 1A is a diagram showing the architecture of a new radio (NR) system referred to for description of the disclosure.

In the description of embodiments of this specification, descriptions of technical details well known in the art and not directly related to the disclosure may be omitted. This is to more clearly convey the gist of the disclosure without obscurities by omitting unnecessary descriptions.

Likewise, in the accompanying drawings, some elements are exaggerated, omitted, or only outlined in brief. Also, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card.

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. Further, the terms described below are defined in consideration of their functions in the disclosure, and these may vary depending on the intention of the user, the operator, or the custom. Hence, their meanings should be determined based on the overall contents of this specification.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in LTE and NR standards, which are the latest standards defined by the 3rd Generation Partnership Project (3GPP) organization among communication standards that currently exist. However, the disclosure is not limited by the above terms and names, and may be equally applied to systems conforming to other standards. In particular, the disclosure is applicable to 3GPP NR (or, 5th generation (5G) mobile communication standards).

FIG. 1A is a diagram showing the architecture of an NR system being referred to for description of the disclosure. With reference to FIG. 1A, the wireless communication system is composed of plural base stations 1*a*-05, 1*a*-10, 1*a*-15 and 1*a*-20, Access and Mobility Management Function (AMF) 1*a*-20, and User Plane Function (UPF) 1*a*-30. A user equipment (UE or terminal) 1*a*-35 connects to an external network through the base station 1*a*-05, 1*a*-10, 1*a*-15 or 1*a*-20 and the UPF 1*a*-30.

The base stations 1*a*-05, 1*a*-10, 1*a*-15 and 1*a*-20 are access nodes of the cellular network and provide radio access to UEs connecting to the network. That is, the base stations 1*a*-05, 1*a*-10, 1*a*-15 and 1*a*-20 support the connection between the UEs and the core network (CN, in particular, the CN of NR is called 5GC (5th generation core)) to service users' traffic, where they perform scheduling by collecting state information of the UEs such as buffer status, available transmission power status, and channel status. Meanwhile, in communication, the user plane (UP) related to actual user data transmission and the control plane (CP) related to connection management can be divided and separately configured; in this drawing, gNBs 1*a*-05 and 1*a*-20 use UP and CP techniques defined in the NR technology, and ng-eNBs 1*a*-10 and 1*a*-15 use UP and CP techniques defined in the LTE technology although being connected to the 5GC.

The AMF/SMF 1*a*-25 is an entity responsible for various control functions as well as a mobility management function for the UEs and is connected to plural base stations, and the UPF 1*a*-30 is a kind of gateway device that provides data transfer.

Figure 1B:
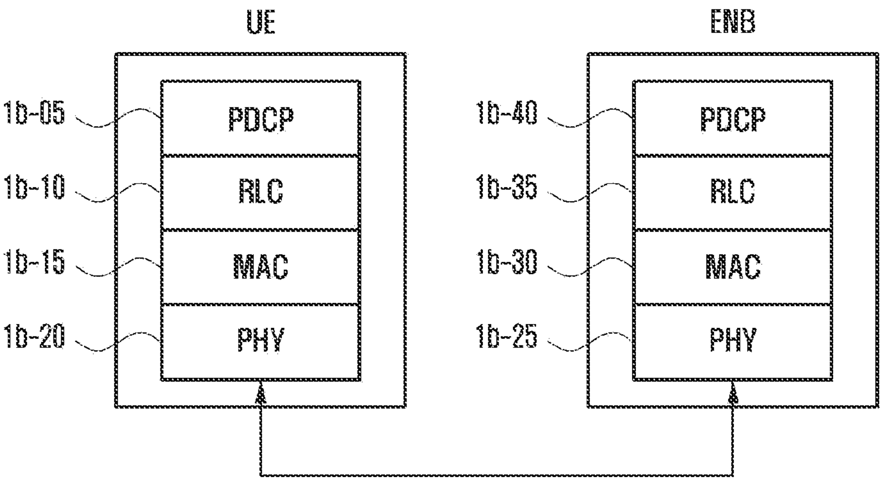
FIG. 1B is a diagram illustrating the structure of radio protocols in long term evolution (LTE) and NR systems referred to for description of the disclosure.

FIG. 1B is a diagram illustrating the structure of radio protocols in LTE and NR systems referred to for description of the disclosure.

With reference to FIG. 1B, in a UE or an eNB/gNB, the radio protocols of the LTE or NR system are composed of packet data convergence protocol (PDCP) 1*b*-05 or 1*b*-40, radio link control (RLC) 1*b*-10 or 1*b*-35, and medium access control (MAC) 1*b*-15 or 1*b*-30. The packet data convergence protocol (PDCP) 1*b*-05 or 1*b*-40 performs compression and decompression of IP headers, and the radio link control (RLC) 1*b*-10 or 1*b*-35 reconfigures PDCP PDUs (packet data unit) to a suitable size. The MAC 1*b*-15 or 1*b*-30 is connected with multiple RLC entities in a UE, and it multiplexes RLC PDUs into MAC PDUs and demultiplexes MAC PDUs into RLC PDUs. The physical layer (PHY) 1*b*-20 or 1*b*-25 converts higher layer data into OFDM symbols by means of channel coding and modulation and transmits the OFDM symbols through a wireless channel, or it demodulates OFDM symbols received through a wireless channel, performs channel decoding, and forwards the result to a higher layer. Further, in the physical layer, HARQ (hybrid ARQ) is used for additional error correction, and the receiving end transmits one bit indicating reception of a packet transmitted from the transmitting end. This is called HARQ ACK/NACK information. In LTE, downlink HARQ ACK/NACK information for an uplink data transmission is transmitted through PHICH (Physical Hybrid-ARQ Indicator Channel); in NR, it can be determined whether retransmission or new transmission is required based on scheduling information of the corresponding UE on Physical Dedicated Control CHannel (PDCCH), which is a channel through which downlink/uplink resource allocation, etc. are transmitted. This is because asynchronous HARQ is applied in NR. Uplink HARQ ACK/NACK information for a downlink data transmission may be transmitted through a physical channel Physical Uplink Control Channel (PUCCH) or Physical Uplink Shared Channel (PUSCH). The PUCCH is generally transmitted in the uplink of the PCell to be described later, but when the UE supports, the PUCCH may be additionally provided to the UE by the base station via a SCell to be described later, which is referred to as PUCCH SCell.

Although not shown in the drawing, the Radio Resource Control (RRC) layer is present on top of the PDCP layer of each of the UE and the base station, and the RRC layers may transmit and receive connection and measurement related configuration control messages for radio resource control.

Meanwhile, the PHY layer may be composed of one or plural frequencies/carriers, and a technique for simultaneously configuring and using a plurality of frequencies in one base station is called carrier aggregation (CA). A single carrier may be used for communication between the UE and the base station (eNB in LTE or gNB in NR), but when CA is employed, a primary carrier and one or more secondary carriers may be used for communication, significantly increasing the data transfer rate by an amount corresponding to the number of additional secondary carriers. Meanwhile, in LTE, a cell in a base station utilizing a primary carrier is called a primary cell (PCell), and a cell utilizing a secondary carrier is called a secondary cell (SCell). A technology in which the CA function is extended to two base stations is called dual connectivity (DC). In DC, the UE connects to a master base station (master E-UTRAN NodeB, referred to as MeNB) and a secondary base station (secondary E-UTRAN NodeB, referred to as SeNB) at the same time; cells belonging to the MeNB are called a master cell group (MCG), and cells belonging to the SeNB are called a secondary cell group (SCG). There is a representative cell for each cell group; the representative cell of the MCG is called a primary cell (PCell), and the representative cell of the SCG is called a primary secondary cell (PSCell). When using NR described above, the UE can utilize LTE and NR at the same time by using the MCG based on LTE technology and the SCG based on NR technology. In NR, for each cell group (i.e., MCG or SCG), a maximum of 16 serving cells may be provided (PCell and SCells for MCG; PSCell and SCells for SCG).

Although not shown in the drawing, the Radio Resource Control (RRC) layer is present on top of the PDCP layer of each of the UE and the base station, and the RRC layers may transmit and receive connection and measurement related configuration control messages for radio resource control. For example, it is possible to instruct the UE to perform measurement by using a RRC layer message, and the UE may report the measurement result to the base station by using a RRC layer message.

Figure 1C:
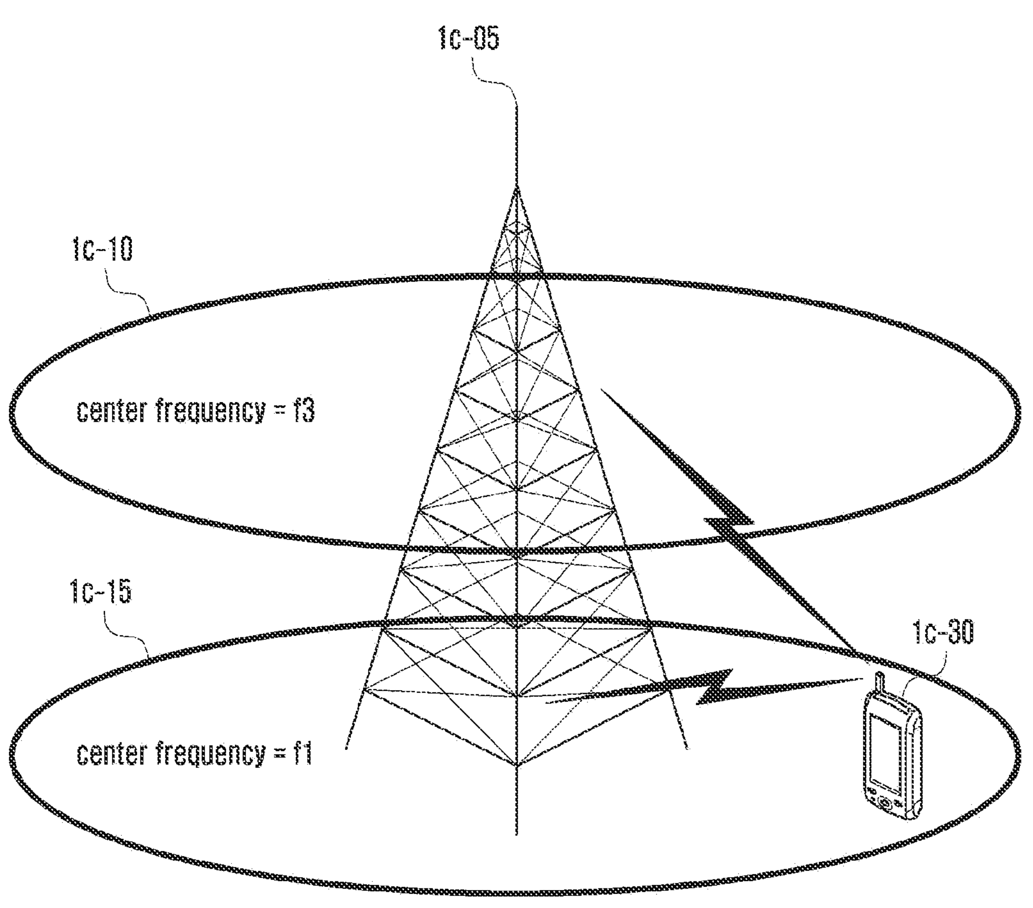
FIG. 1C is a diagram for explaining carrier aggregation in a UE.

FIG. 1C is a diagram for explaining carrier aggregation in a UE.

With reference to FIG. 1C, one base station transmits and receives multiple carriers across multiple frequency bands. For example, when the base station 1*c*-05 transmits a carrier 1*c*-15 with a center frequency f1 and a carrier 1*c*-10 with a center frequency f3, a legacy UE may use one of the two carriers to transmit and receive data. However, a UE having a carrier aggregation capability may transmit and receive data to and from multiple carriers at the same time. The base station 1*c*-05 may assign more carriers to the UE 1*c*-30 having a carrier aggregation capability according to situations, increasing the data rate of the UE 1*c*-30.

In a traditional sense, when one downlink carrier and one uplink carrier provided by one base station constitute a cell, carrier aggregation may be understood as a situation in which a UE transmits and receives data through several cells at the same time. Thereby, the maximum data rate may be increased in proportion to the number of aggregated carriers.

In the following description of the disclosure, for a UE, data reception through a downlink carrier and data transmission through an uplink carrier may be identical in meaning to data transmission and reception through control and data channels provided by a cell corresponding to a center frequency and frequency bands characterizing the above carriers. In addition, embodiments of the disclosure will be described based on the LTE system for convenience of explanation, but the disclosure can be applied to various wireless communication systems supporting carrier aggregation.

Even with or without carrier aggregation, since uplink transmission (i.e., from UE to base station) causes interference in the uplink direction of another cell, uplink transmission output must be maintained at an appropriate level. To this end, to perform uplink transmission, the UE calculates an uplink transmission output by using a specific function, and performs uplink transmission with the calculated uplink transmission output. For example, the UE calculates a required uplink transmission output value by inputting, to the specific function, scheduling information such as the amount of allocated transmission resources and the modulation coding scheme (MCS) level to be applied and input values for estimating channel conditions such as the path loss value, and performs uplink transmission by applying the calculated required uplink transmission output value. The uplink transmission output value that can be applied by a UE is limited by the maximum transmission value of the UE; and if the calculated required transmission output value exceeds the maximum transmission value of the UE, the UE performs uplink transmission by applying the maximum transmission value. In this case, since sufficient uplink transmission output is not applied, the quality of uplink transmission may be degraded. The base station preferably performs scheduling so that the required transmission output does not exceed the maximum transmission output. However, as the base station cannot identify some parameters such as path loss, the UE transmits a power headroom report (PHR) when necessary to notify the base station of its available transmission output (power headroom, PH) status.

Factors affecting the available transmission output include 1) the amount of allocated transmission resources, 2) MCS to be applied to uplink transmission, 3) path loss of associated downlink carrier, and 4) cumulative output adjustment command value. Among them, the path loss (PL) or cumulative output adjustment command value may be different for individual uplink carriers; if a plurality of uplink carriers are aggregated in one UE, it is proper to configure PHR transmission for each uplink carrier. However, for efficient PHR transmission, the UE may report all PHs for multiple uplink carriers on one uplink carrier. Depending on the operation strategy, a PH for a carrier in which actual PUSCH transmission has not occurred may be required. Therefore, in such a case, a scheme of reporting all PHs for multiple uplink carriers on one uplink carrier may be more efficient. To this end, the existing PHR must be extended. A plurality of PHs to be included in one PHR will be configured according to a preset order.

The PHR is normally triggered when the path loss of the connected downlink carrier changes by more than a specific reference value, when the prohibit PHR timer expires, or when a specific period elapses after PHR generation. Even if the PHR is triggered, the UE does not immediately transmit the PHR but waits until a time point when uplink transmission is possible, for example, a time point when uplink transmission resources are allocated. This is because the PHR is not information requiring immediate handling.

FIG. 1D is a diagram for explaining the concept of dual connectivity.

Dual connectivity (DC) allows a UE to connect to and use two base stations simultaneously, and this illustrative diagram shows a case in which a UE 1*d*-05 transmits and receives data by simultaneously connecting to a macro base station 1*d*-00 using LTE technology and a small cell base station 1*d*-10 using NR technology. This is called EN-DC (E-UTRAN-NR dual connectivity). The macro base station is referred to as MeNB (master E-UTRAN NodeB), and the small cell base station is referred to as SgNB (secondary 5G NodeB). Several small cells may exist within the service area of the MeNB, and the MeNB is connected to the SgNBs through a wired backhaul network 1*d*-15. The set of serving cells provided by the MeNB is called a master cell group (MCG) 1*d*-20, and one serving cell of the MCG must be a primary cell (PCell) 1*d*-25 that has all the functions that a legacy cell has performed, such as connection establishment, connection re-establishment, and handover. Additionally, the PCell has a PUCCH being an uplink control channel. A serving cell other than the PCell is referred to as a secondary cell (SCell) 1*d*-30. FIG. 1D illustrates a scenario in which the MeNB provides one SCell and the SeNB provides three SCells. A set of serving cells provided by the SeNB is referred to as a secondary cell group (SCG) 1*d*-40. When the UE transmits and receives data from two base stations, the MeNB issues, to the SeNB, a command to add, change, or remove a serving cell provided by the SeNB. To issue such a command, the MeNB may configure the UE to measure the serving and neighboring cells. The UE must report the measurement result to the MeNB according to the configuration information. In order for the SeNB to efficiently transmit and receive data to and from the UE, a serving cell that plays a role similar to that of the PCell of the MCG is required, and this is referred to as a primary SCell (PSCell) in the disclosure. The PSCell is determined to be one of serving cells of the SCG and is characterized by having a PUCCH being an uplink control channel. The PUCCH is used by the UE to transmit HARQ ACK/NACK information, channel status information (CSI), scheduling request (SR) or the like to the base station.

Meanwhile, in the DC scenario, the MCG and the SCG each have independent MAC entities. That is, there are two MAC entities in DC. Accordingly, various MAC functions (e.g., PHR reporting, etc.) are independently performed for each base station.

Figure 1E:
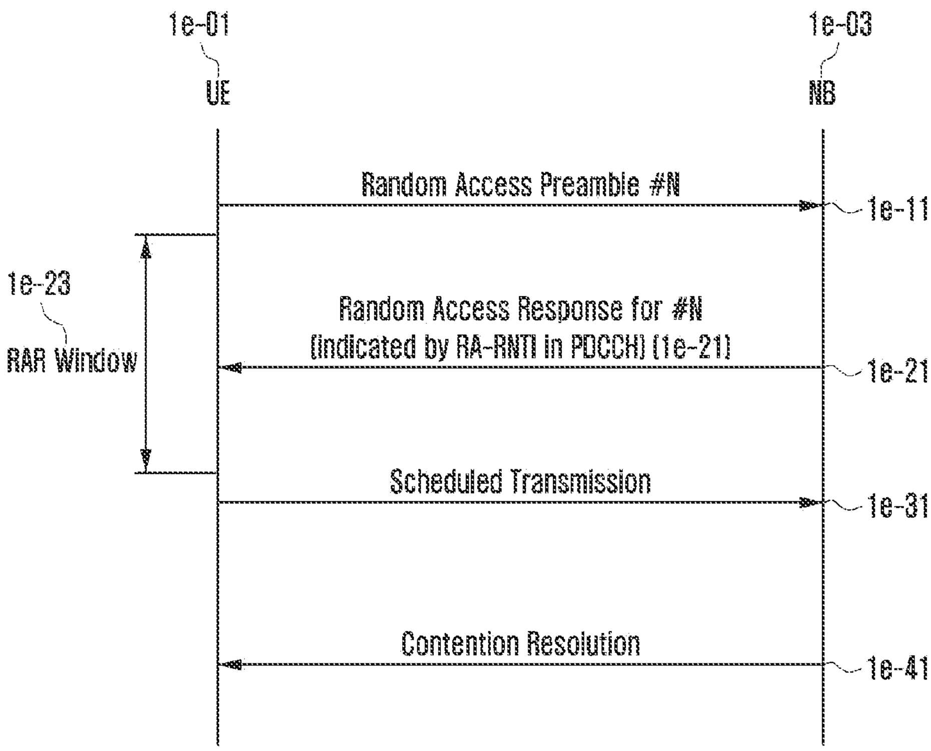
FIG. 1E is a diagram illustrating a procedure for a UE to perform contention-based four-step random access to a base station.

FIG. 1E is a diagram illustrating a contention-based four-step random access procedure performed by the UE in various cases requiring random access to the base station such as initial access, reconnection, and handover.

To access the base station 1*e*-03, the UE 1*e*-01 may select a PRACH according to the description of FIG. 1E and transmit a random access preamble via the corresponding PRACH (1*e*-11). A case in which one or more UEs simultaneously transmit a random access preamble via the PRACH resource may occur. The PRACH resource may span one subframe, or only some symbols within one subframe may be used. The information on the PRACH resources is included in the system information (e.g., SIB 1 (system information block 1)) broadcast by the base station, and hence it is possible to identify which time-frequency resource should be used to transmit a preamble. In addition, the random access preamble is a specific sequence specially designed so that it can be received even if it is transmitted before being completely synchronized with the base station, and there may be a plurality of preamble identifiers (indexes) according to the standards; if there are plural preamble identifiers, the preamble transmitted by a UE may be one randomly selected by the terminal or may be a specific one designated by the base station.

Upon receiving the preamble, the base station may transmit a random access response (RAR) message (also referred to as Msg2) to the UE (1*e*-21). The RAR message may include identifier information of the preamble used at step 1*e*-11, and may include uplink transmission timing adjustment information, uplink resource allocation information to be used at a subsequent step (i.e., step 1*e*-31), temporary UE identifier information, and the like. For example, when plural UEs attempt random access by transmitting different preambles at step 1*e*-11, the RAR message may include responses for the individual preambles, in which case the preamble identifier information may be transmitted to indicate which preamble the corresponding response is for. The uplink resource allocation information, which is included in each response for each preamble, is detailed information about the resource to be used by the UE at step 1*e*-31, and may include the physical location and size of the resource, a modulation and coding scheme (MCS) used for transmission, power adjustment information during transmission, and the like. The temporary UE identifier information may be a value transmitted to be used in a case where the UE, which has transmitted the preamble but does not have an identifier assigned by the base station for communication with the base station, performs initial access.

Meanwhile, the RAR message may optionally include a backoff indicator (BI) in addition to response(s) to the individual preambles. The backoff indicator may be a value transmitted to delay transmission randomly according to the value thereof rather than immediately retransmitting the preamble when the random access preamble needs to be retransmitted because of unsuccessful random access. More specifically, when the UE does not properly receive the RAR, or contention resolution, which will be described later, is not properly achieved, it may have to retransmit the random access preamble. Here, the value indicated by the backoff indicator may be an index value below, and the UE randomly selects a value from the range of 0 to the value indicated by the index and retransmits the random access preamble after a time corresponding to the selected value. For example, in case that the base station indicates 5 (i.e., 60 ms) as a BI value, when the UE randomly selects a value of 23 ms from the range of 0 to 60 ms, the UE may store the selected value in a variable called PREAMBLE BACKOFF and perform a procedure of retransmitting the preamble after 23 ms. If the backoff indicator is not transmitted, when the random access preamble needs to be retransmitted because random access is not successfully performed, the UE immediately transmits the random access preamble.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message should be transmitted within a preset period starting from a specific time after the preamble is transmitted, and this period is referred to as 'RAR window'. The RAR window starts from a point in time when a specific time has elapsed from the transmission of the preamble. The specific time may be a time point at which the PDCCH scheduling the RAR message is first monitored. In addition, the length of the RAR window may be a specific value set by the base station for each PRACH resource or for each set of one or more PRACH resources in a system information message broadcast by the base station. On the other hand, when the RAR message is transmitted, the base station schedules the RAR message through the PDCCH, and corresponding scheduling information may be scrambled with a random access-radio network temporary identifier (RA-RNTI). The RA-RNTI is mapped to the PRACH resource used to transmit the message 1*e*-11; the UE having transmitted a preamble via a specific PRACH resource may determine whether there is a corresponding RAR message by attempting to receive the PDCCH based on the corresponding RA-RNTI. That is, if the RAR message is a response to the preamble transmitted by the UE at step 1*e*-11 as shown in this illustrative diagram, the RA-RNTI used for this RAR message scheduling information may include information on the corresponding transmission 1*e*-11. To this end, the RA-RNTI can be calculated by the equation below.

$$RA-RNTI = 1 + s\_id + 14 \times t\_id + 14 \times 80 \times f\_id + 14 \times 80 \times 8 \times ul\_carrier\_id \quad \text{Equation 1}$$

Here, s_id is an index corresponding to the first OFDM symbol at which the preamble transmission at step 1*e*-11 is started, and has a value of $0 \le s\_id < 14$ (i.e., maximum number of OFDM symbols in one slot). Also, t_id is an index corresponding to the first slot in which the preamble transmission at step 1*e*-11 is started, and has a value of $0 \le t\_id < 80$ (i.e., maximum number of slots in one system frame (10 ms)). Further, f_id indicates the ordinality of the PRACH resource on frequency through which the preamble at step 1*e*-11 is transmitted, and has a value of $0 \le f\_id < 8$ (i.e., maximum number of PRACHs on frequency within the same time). In addition, when two carriers are used in uplink for one cell, ul_carrier_id is a factor for discriminating whether the preamble is transmitted via the normal uplink (NUL) (0 in this case) or is transmitted via the supplementary uplink (SUL) (1 in this case).

Upon receiving the RAR message, the UE transmits a different message over the resource allocated via the RAR message according to various purposes described above (1*e*-31). It is the third message transmitted in this illustrative drawing and is also called Msg3 (that is, the preamble at step 1*e*-11 is called Msg1, and the RAR at step 1*e*-21 is called Msg2). As an example of Msg3 transmitted by the UE, an RRCSetupRequest message being an RRC layer message is transmitted for initial access, an RRCReestablishmentRequest message is transmitted for reconnection, and an RRCReconfigurationComplete message is transmitted for handover. Alternatively, a buffer status report (BSR) message may be transmitted for requesting a resource.

Thereafter, the UE receives a contention resolution message from the base station (1*e*-41) in case of initial transmission (i.e., when Msg3 does not include base station identifier information previously assigned to the UE, etc.); the contention resolution message includes the contents transmitted in Msg3 by the UE as it is, so that even if there are plural UEs that have selected the same preamble at step 1*e*-11 or 1*e*-13, the response for which UE may be notified.

Figure 1F:
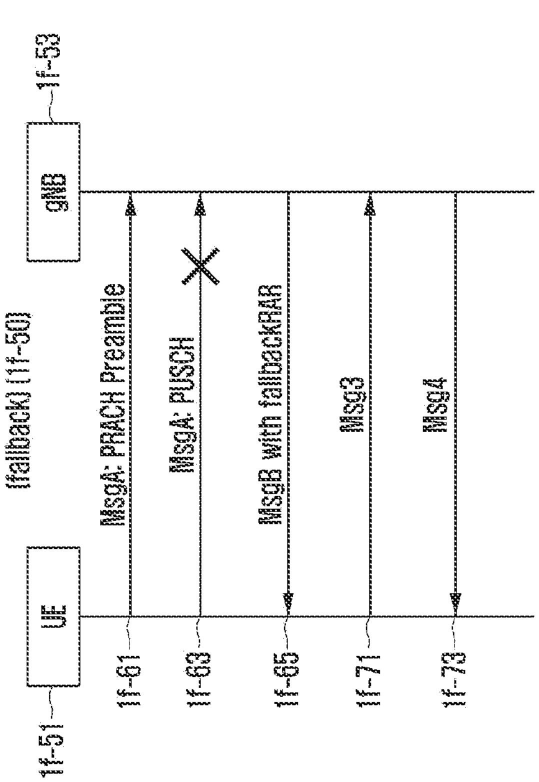
FIG. 1F is a diagram illustrating a procedure for a UE to perform two-step random access to a base station.

FIG. 1F is a diagram illustrating a procedure for the UE to perform 2-step random access to the base station.

As described above in FIG. 1C, in the case of performing general contention-based random access, at least four steps are carried out, and if an error occurs at one step, the procedure may be further delayed. Accordingly, a scenario in which the random access procedure is shortened to a two-step procedure can be considered.

To this end, the UE transmits MsgA, which successively transmits a preamble (Msg1) (1*f*-11) (corresponding to 1*c*-11) and Msg3 (1*f*-13) (corresponding to 1*c*-31) of the 4-step random access procedure, to the base station (1*f*-15), and then the base station transmits MsgB (1*f*-19), which includes information of Msg2 (RAR) (corresponding to 1*c*-21) and Msg4 (corresponding to 1*c*-41) of the 4-step random access procedure, to the UE, so that the random access procedure can be shortened. The procedure according to this is described in part 1*f*-00 of FIG. 1F.

Here, when shown on time, MsgA may be composed of a PRACH resource 1*f*-21 for transmitting Msg1, a PUSCH resource 1*f*-23 for transmitting Msg3, and a gap resource 1*f*-22 for solving an interference problem that may occur due to PUSCH resource transmission. In addition, Msg3 includes information about Msg1, making it known that this Msg3 is transmitted by a UE having transmitted a specific preamble (Msg1).

As described above in FIG. 1C, the UE performs random access for various purposes. For example, the UE may perform random access in order to transmit a message for connection while not yet connected to the base station, or to transmit a message for restoring the connection when an established connection is disconnected due to an error, in which case the above message is a message belonging to the common control channel (CCCH). Control messages belonging to the CCCH include RRCSetupRequest (transitioning from idle mode (RRC_IDLE) to connected mode), RRCResumeRequest (transitioning from inactive mode (RRC_INACTIVE) to connected mode), RRCReestablishmentRequest (restoring the connection), RRCSystemInfoRequest (requesting system information broadcast by the base station). Hence, when the UE performs 2-step random access, the UE may transmit MsgA including the above messages. If the UE performs random access in connected state after connecting to the base station, the UE transmits a C-RNTI MAC CE including the UE identifier information through MsgA to thereby notify that the subject performing random access is the corresponding UE.

Upon receiving both Msg1 and Msg3 included in MsgA, the base station transmits MsgB to the UE (1*f*-19). Here, MsgB may include a BI described above. Additionally, when MsgA includes a CCCH message described above, uplink transmission timing information (timing advance command (TAC)) transmitted via Msg2 described above, a temporary UE identifier (temporary C-RNTI) to be used by the UE for the base station, and contention resolution related information (UE contention resolution identity) transmitted via Msg4 are included. Further, if the UE is already connected to the base station and transmits a C-RNTI MAC CE including UE identifier information via MsgA, the message itself by which the base station allocates resources to the corresponding UE through the PDCCH by use of the identifier (C-RNTI) of the corresponding UE becomes MsgB.

On the other hand, if multiple MsgAs are transmitted at step 1*f*-15 to cause a collision, a case in which the base station receives only Msg1 (*s*) included in MsgA (1*f*-61) and does not receive Msg3 (1*f*-63) may occur. In this case, the base station may transmit Msg2 described above to the terminal (1*f*-65) instead of transmitting MsgB (1*f*-19), performing the remaining random access procedure by switching to the 4-step random access procedure described in FIG. 1C. This is described in part 1*f*-50 of FIG. 1F, and the mode in which two-step random access is switched to four-step random access is referred to as fallback mode. That is, when the base station receives a message from the UE only via a PRACH resource (1*f*-61) (1*f*-21), the base station responds to the corresponding UE with fallbackRAR similar to Msg2 used in the 4-step random access procedure (1*f*-65), allowing the UE to transmit and receive Msg3 (1*f*-71) and Msg4 (1*f*-73) of the 4-step random access procedure.

FIG. 1G is an illustrative diagram of frame structures for downlink and uplink channels when beam-based communication is performed in an NR system.

In FIG. 1G, the base station 1*g*-01 transmits a signal in the form of a beam in order to transmit a wider coverage or stronger signal (1*g*-11) (1*g*-13) (1*g*-15) (1*g*-17). Accordingly, the UE 1*g*-03 within a cell must transmit and receive data by using a specific beam (beam #1 (1*g*-13) in this illustrative drawing) transmitted by the base station.

Meanwhile, depending on whether the UE is connected to the base station, the state of the UE may be divided into idle mode (RRC_IDLE) state and connected mode (RRC_CONNECTED) state. Hence, the base station does not know the location of a UE in idle mode state.

If the UE in idle mode state wants to transition to connected mode state, it receives synchronization signal blocks (SSBs) 1*g*-21, 1*g*-23, 1*g*-25, 1*g*-27 transmitted by the base station. This SSB is a signal that is periodically transmitted according to the periodicity set by the base station, and each SSB may include Primary Synchronization Signal (PSS) 1*g*-41, Secondary Synchronization Signal (SSS) 1*g*-43, and Physical Broadcast CHannel (PBCH).

In this illustrative drawing, a scenario in which SSBs are transmitted for each beam is assumed. For example, it is assumed that SSB #0 (1*g*-21) is transmitted using beam #0 (1*g*-11), SSB #1 (1*g*-23) is transmitted using beam #1 (1*g*-13), SSB #2 (1*g*-25) is transmitted using beam #2 (1*g*-15), and SSB #3 (1*g*-27) is transmitted using beam #3 (1*g*-17). In this illustrative drawing, it is assumed that the UE in idle mode is located at beam #1, but when a UE in connected mode performs random access, the UE selects the SSB received at the time of performing random access.

Hence, in this drawing, the UE receives SSB #1 transmitted through beam #1. Upon receiving SSB #1, the UE may obtain a physical cell identifier (PCI) of the base station through the PSS and SSS and receive the PBCH, so that it can identify the identifier (i.e., #1) of the currently received SSB, identify the position of the currently received SSB within a 10 ms frame, identify the SFN of the currently received SSB within the system frame number (SFN) having a periodicity of 10.24 seconds. In addition, the PBCH includes a master information block (MIB), and this MIB can notify the location at which system information block type 1 (SIB1), which broadcasts more detailed cell configuration information, can be received. Upon receiving SIB1, the UE may identify the total number of SSBs transmitted by this base station, and identify the locations of physical random access channel (PRACH) occasions (in this illustrative drawing, a scenario in which a PRACH occasion is allocated every 1 ms is assumed: from 1*g*-30 to 1*g*-39) at which random access can be performed for transitioning to connected mode state (more precisely, a preamble, which is a physical signal specially designed for uplink synchronization, can be transmitted). Further, based on the above information, the UE may identify which PRACH occasion among the PRACH occasions is mapped to which SSB index. For example, in this illustrative drawing, a scenario in which a PRACH occasion is allocated every 1 ms is assumed, and a scenario in which ½ SSB is allocated per PRACH occasion (i.e., 2 PRACH occasions per SSB) is assumed. Accordingly, a scenario in which, from the start of the PRACH occasion that starts according to the SFN value, two PRACH occasions are allocated for each SSB is illustrated. That is, PRACH occasions 1*g*-30 and 1*g*-31 are allocated for SSB #0, PRACH occasions 1*g*-32 and 1*g*-33 are allocated for SSB #1, and so on. After assignment for all SSBs, PRACH occasions 1*g*-38 and 1*g*-39 may be allocated again for the first SSB.

Accordingly, the UE identifies the location of PRACH occasions 1*g*-32 and 1*g*-33 for SSB #1, and then it transmits a random access preamble at the earliest PRACH occasion (e.g., 1*g*-32) from the current time point among PRACH occasions 1*g*-32 and 1*g*-33 corresponding to SSB #1. The base station having received the preamble at PRACH occasion 1*g*-32 can be aware that the corresponding UE has selected SSB #1 and transmitted the preamble, and hence it transmits and receives data through the corresponding beam when performing subsequent random access.

Meanwhile, when the UE in connected state moves from the current (source) base station to the target base station due to handover or the other, the UE performs random access to the target base station, where the UE selects an SSB and performs an operation of transmitting random access as described above. Further, during handover, the source base station transmits a handover command to the UE to move to the target base station, in which case the above message may allocate a dedicated random access preamble identifier to the corresponding UE for each SSB of the target base station so as to be used when performing random access to the target base station. Here, the base station may not allocate a dedicated random access preamble identifier to all beams (according to the current location of the UE or the other), and a dedicated random access preamble may be not allocated to some SSBs correspondingly (e.g., dedicated random access preamble allocated only to beam #2 and beam #3). If a dedicated random access preamble is not allocated to the SSB selected by the UE for preamble transmission, the UE randomly selects a contention-based random access preamble to perform random access. For example, in this drawing, a scenario is possible in which after the UE initially performs random access at beam #1 but fails, the UE transmits a dedicated preamble at beam #3 when transmitting a random access preamble again. In random access, that is, within one random access procedure, when preamble retransmission occurs, a contention-based random access process and a contention-free random access process may be mixed depending on whether a dedicated random access preamble is allocated to the SSB selected for each preamble transmission.

Further, if the UE suddenly moves within one base station even without handover described above, it may get out of the beam being currently used for data transmission and reception; if the base station does not recognize such a situation and does not change the beam, a beam failure may be detected. This is called beam failure detection (BFD).

For example, in case that the base station has configured the UE in connected state to detect a beam failure for SSBs corresponding to beam #1 (1*g*-13) and beam #2 (1*g*-15) by use of a RRC layer message, when the UE is moved to beam #3 (1*g*-17), as the UE fails to detect both beam #1 and beam #2, the physical layer of the UE transmits a beam failure instance indication to the MAC layer of the UE. Upon receiving the beam failure instance indication, the MAC layer starts beamFailureDetectionTimer (or, restarts beamFailureDetectionTimer if it is already running) and increases the counter (BFI_COUNTER) by 1. When the counter value reaches a threshold (beamFailureInstanceMaxCount) set by a RRC layer message (i.e., equal to or greater than), the UE concludes that a beam failure has occurred and performs a procedure for recovering the beam failure (beam failure recovery).

Such a beam failure may occur in the SpCell or the SCell. For example, when the SpCell uses a low frequency that hardly uses a beam and the SCell uses a high frequency that uses a narrow beam, a beam failure may occur in the SCell.

If a beam failure occurs in a SCell, the UE may notify the fact that a beam failure has occurred in a specific SCell by transmitting a MAC control element (MAC CE) being a MAC layer control message. More specifically, additional information about which SCell has a beam failure and which beam of the corresponding SCell should be used may also be included in the MAC CE. To transmit the MAC CE, the UE should make a request for uplink resources to the base station. The MAC CE used for the above purpose is referred to as beam failure recovery (BFR) MAC CE or SCell BFR MAC CE.

In existing LTE and NR, an uplink resource request is made by transmitting a buffer status report (BSR) MAC CE; in the case of a regular BSR among the conditions under which BSR transmission is triggered, the base station may be allowed to perform uplink allocation for transmitting the BSR by triggering a scheduling request (SR) and transmitting 1-bit information to the base station over the PUCCH resource previously allocated for the SR assigned by an RRC layer message.

However, to request transmission of a BFR MAC CE, the base station may be allowed to perform uplink allocation for transmitting the BFR MAC CE by transmitting 1-bit information to the base station over the PUCCH resource previously allocated for the SR assigned by an RRC layer message to this end. After transmitting the SR, the UE with uplink allocation transmits a BFR MAC CE to be described later to notify the base station that BFR is required for the corresponding SCell.

If a beam failure occurs in the SpCell, the UE may recover it by using a random access procedure. For example, the base station may allocate a dedicated random access preamble for each beam in preparation for a beam failure on the UE; if a dedicated preamble identifier is set for beam #3 in this drawing for instance, when the UE selects beam #3 by performing random access after beam failure detection, it immediately notifies the base station that the UE has selected beam #3 due to beam failure detection by transmitting the corresponding dedicated preamble identifier, so that the base station may be allowed to adjust the beam for the corresponding UE. Alternatively, even when a dedicated random access preamble is not allocated, the UE may perform contention-based random access to notify the base station that the corresponding UE is currently operating on a beam selected during current random access. In addition, the UE may transmit it by including a separate additional message to notify the base station that the UE has performed random access because of BFR.

FIG. 1H is a diagram illustrating the necessity and role of an uplink timing synchronization procedure in a system to which an OFDM scheme is applied.

UE1 (terminal 1) represents a UE located close to the base station (gNB), and UE2 (terminal 2) represents a UE located far away from the gNB. A first propagation delay time (T_pro1) represents a propagation delay time in radio transmission to UE1, and a second propagation delay time (T_pro2) represents a propagation delay time in radio transmission to UE2. As shown in FIG. 1H, UE1 is located closer to the gNB than UE2, so it can be seen that UE1 has a relatively small propagation delay time. (in FIG. 4, T_pro1 is 0.333 us, T_pro2 is 3.33 us)

When UE1 and UE2 are powered on in one cell of the gNB in FIG. 1H, or when UE1 and UE2 are in idle mode, a problem arises in that uplink timing synchronization of UE1, uplink timing synchronization of UE2, and uplink timing synchronization of UEs within the cell detected by the gNB do not match each other.

Indicia (1*h*-01) indicates timing synchronization for uplink transmission of an OFDM symbol of UE1, and (1*h*-03) indicates timing synchronization for uplink transmission of an OFDM symbol of UE2. Considering propagation delay times of uplink transmissions of UE1 and UE2, the timings at the NB receiving uplink OFDM symbols are indicated by (1*h*-05), (1*h*-07), and (1*h*-09), respectively. That is, the uplink symbol of UE1 indicated by (1*h*-01) is received, after its propagation delay time, by the gNB at a timing indicated by (1*h*-07), and the uplink symbol of UE2 indicated by (1*h*-03) is received, after its propagation delay time, by the gNB at a timing indicated by (1*h*-09). As shown in FIG. 1H, (1*h*-07) and (1*h*-09) are still before uplink timing synchronization is established for UE1 and UE2, so it can be seen that the start timing for the NB having received an uplink OFDM symbol to decode it (1*h*-05), the timing of receiving an OFDM symbol from UE1 (1*h*-07), and the timing of receiving an OFDM symbol from UE2 (1*h*-09) are different.

As a result, the uplink symbols transmitted from UE1 and UE2 do not have orthogonality and act as interference with each other; a problem arises in that the gNB cannot successfully decode uplink symbols (1*h*-01) and (1*h*-03) transmitted from UE1 and UE2 due to the above interference and the uplink symbol reception timings (1*h*-07) and (1*h*-09) being out of sync with (1*h*-05).

The uplink timing synchronization procedure is a process of making the uplink symbol reception timings equal for UE1, UE2, and the NB; when the uplink timing synchronization procedure is completed, as indicated by (1*h*-11), (1*h*-13) and (1*h*-15), the start timing of decoding a received uplink OFDM symbol, the timing of receiving an uplink OFDM symbol from UE1, and the timing of receiving an uplink OFDM symbol from UE2 in the NB are matched. More specifically, the timings are matched by aligning uplink symbol reception timings with an error within the cyclic prefix (CP) length, enabling the base station to perform decoding.

In the uplink timing synchronization procedure, the base station transmits timing advance (TA) information to the UEs to provide information on how much timing should be adjusted. More specifically, based on a specific downlink (1*h*-21), the base station provides UEs with information about how early transmission should be performed with respect to the corresponding downlink.

Here, the TA information may be transmitted by the base station through a timing advance command MAC control element (TAC MAC CE), or may also be transmitted through a response message (random access response, RAR) to a random access preamble transmitted by the UE performing random access, which will be described later. This applies to both LTE and NR.

Taking an example of LTE for more detailed description, in the case of RAR, the TA information is 12 bits, and calculation is performed by $N_{TA}$=TA*16 accordingly. Additionally, in the case of TAC MAC CE, it has a 6-bit TA value, and a relative value that varies according to the existing $N_{TA}$ value ($N_{TA,old}$) is calculated. That is, the following equation is followed: $N_{TA,new}=N_{TA,old}+(TA-31)*16$. Accordingly, uplink transmission is transmitted $(N_{TA}*N_{TA\_offset})*T_s$ earlier than the downlink reference (1 h-23). The $N_{TA}$ offset value is 0 for the FDD system and 624 for the TDD system. Also, $T_s$ has a value of 1/(3048*subcarrier spacing). Accordingly, the UE may adjust the uplink transmission timing based on the TA information.

Upon receiving the TA information, the UE starts a time alignment timer (timeAlignmentTimer, TAT). The TAT is a timer indicating whether the TA is valid. That is, it is determined that the TA is valid during a period in which the TAT is running, but it cannot be guaranteed that the TA is valid after the TAT expires.

The UE restarts the TAT when TA information is additionally received later; when the TAT expires after a certain period of time, the UE determines that the TA information received from the base station is no longer valid, and stops uplink communication with the corresponding gNB.

When the timings are matched as described above, uplink symbols transmitted from UE1 and UE2 can maintain orthogonality, and the gNB can successfully decode uplink symbols transmitted from UE1 and UE2 (1*h*-01) and (1*h*-03).

Meanwhile, in the random access procedure described above, it is not necessary to apply the TA value when transmitting a preamble. This is because the preamble signal is a signal designed to be decodable even when the arrival times are out of sync as described above. However, in the case of performing two-step random access, data (PUSCH) is transmitted as well as a preamble. Here, the UE needs to define which $N_{TA}$ value should be applied to transmit the PUSCH.

Meanwhile, the TAT is managed in units of TA groups (TAG), which are group units of serving cells (SpCell or SCell); a TAG to which the SpCell (i.e., PCell or PSCell) belongs is referred to as primary TAG (PTAG), and other TAGs are referred to as secondary TAG (STAG). The base station sets tag-Id for a serving cell, and accordingly, the UE can know which TAG the corresponding serving cell belongs to. The base station can configure the UE with a TAT length for each TAG by using an RRCReconfiguration message or the like, and can, when adding a SCell or PSCell to the UE, specify which tag-Id the corresponding serving cell belongs to by using an RRCReconfiguration message or the like.

Figure 1I:
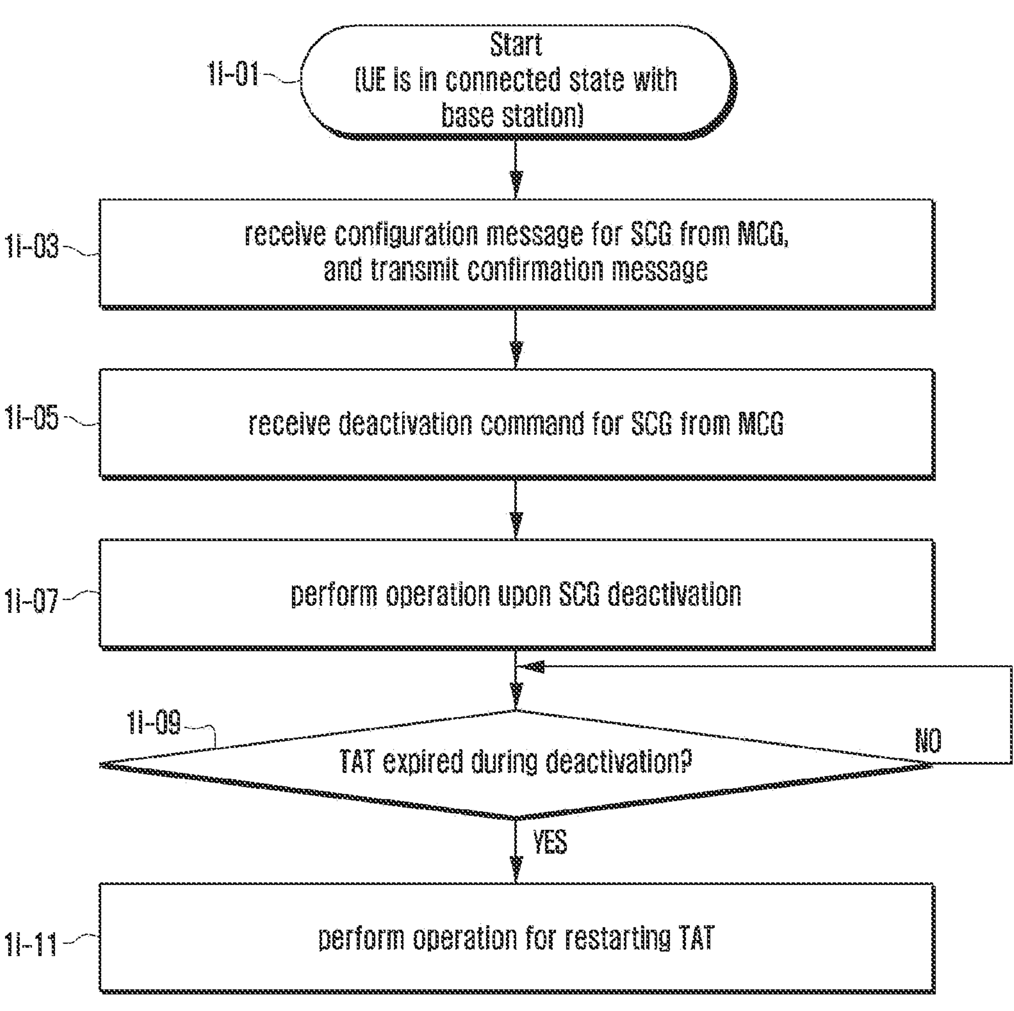
FIG. 1I is an illustrative diagram for a sequence of UE operations when a time alignment timer (TAT) of a PSCell expires in a state where the SCG configured in the UE is deactivated.

FIG. 1I is an illustrative diagram for a sequence of UE operations when a time alignment timer (TAT) of the PSCell (primary secondary cell) expires in a state where the SCG (secondary cell group) configured in the UE is deactivated.

In FIG. 1I, it is assumed that the UE is connected to the base station (master cell group (MCG)) and is in connected mode (RRC_CONNECTED) enabling data communication (1*i*-01). Thereafter, the UE receives configuration information for adding an SCG including the aforementioned PSCell from the MCG, and transmits a confirmation message for this to the MCG (1*i*-03). The configuration information transmitted by the MCG may be received by being included in a RRCReconfiguration message of the RRC layer, and the confirmation message transmitted by the UE may be transmitted by being included in a RRCReconfigurationComplete message of the RRC layer. The configuration information may include at least one of TA-related configuration information of the PSCell, parameters related to beam failure detection (BFD), or parameters related to beam failure recovery (BFR). The UE having received the configuration information may perform random access to the configured PSCell to utilize the PSCell.

Accordingly, both the MCG and the SCG are activated, and the UE is in a state where data can be transmitted and received through two base stations. Also, since the UE has performed random access to the PSCell, it can transmit uplink data through serving cells belonging to the corresponding TAG (timing advance group) while the TAT (time alignment timer) of the TAG to which the PSCell belongs is running. In addition, before or after the expiration of the TAT of the primary timing advance group (PTAG) of the SCG, the base station may transmit a physical downlink control channel (PDCCH) order to the UE. The PDCCH order may be a PDCCH instructing the UE to start random access. The UE having received the PDCCH order may receive a new TA value (included in a random access response (RAR)) in a random access process and (re) start the TAT.

Meanwhile, the UE may receive a command to deactivate the currently active SCG from the MCG (1*i*-05). This can be determined by the MCG or SCG base station according to the amount of data transmitted through the SCG or the like. This deactivation command may be received as an RRC message of the radio resource control (RRC) layer, or may be received through a MAC control element (CE) being a control message of the medium access control (MAC) layer, or through the PDCCH. Upon receiving this, the UE may transmit, to the MCG, a message confirming that the corresponding command has been received. This confirmation message may be transmitted as an RRC message of the RRC layer, or may be transmitted through a MAC control element (CE) being a control message of the MAC layer, or through HARQ feedback. Consequently, the UE may deactivate the corresponding SCG and stop data transmission and reception in the corresponding SCG (1*i*-07), thereby reducing power consumption due to communication with the corresponding SCG.

On the other hand, even after receiving the deactivation command, the UE may not stop the TAT of the PTAG to which the existing PSCell belongs. Hence, even though the SCG is deactivated, the TAT of the PTAG to which the PCell of the SCG belongs may still be running. Later, when the base station reactivates the SCG, if the TAT is running, the UE may immediately transmit uplink data to the SCG, so activation latency can be reduced.

Accordingly, if the TAT to which the PSCell belongs expires while the SCG is deactivated, the UE may perform one of the following operations for restarting the TAT (1*i*-11).

A first option is a method in which the UE performs random access to the PSCell to obtain the TA of the PSCell. Here, when performing random access, the UE transmits a C-RNTI MAC CE including the C-RNTI used in the SCG in the previous active state via Msg3 or MsgA. Accordingly, when the UE successfully completes the random access, the UE restarts the TAT, and the corresponding SCG remains still in inactive state.

A second option is a method in which the UE receives a PDCCH order instructing to perform random access to the PSCell from the MCG base station and performs random access to the PSCell. That is, to receive an updated TA value for the PSCell from the MCG base station before the TAT of the PSCell expires, the UE performs random access to the PSCell. To this end, a separate indicator instructing to perform random access to the PSCell is included in the PDCCH order.

A third option is a method in which the UE receives an instruction to activate the SCG from the MCG base station. That is, before the TAT of the PSCell expires, the UE receives an instruction to activate the SCG from the MCG base station and activates the corresponding PSCell (i.e., SCG).

By using one of the above options, the UE continues to maintain the TA value used in inactive state, so that uplink transmission delay can be reduced upon activation.

Figure 1J:
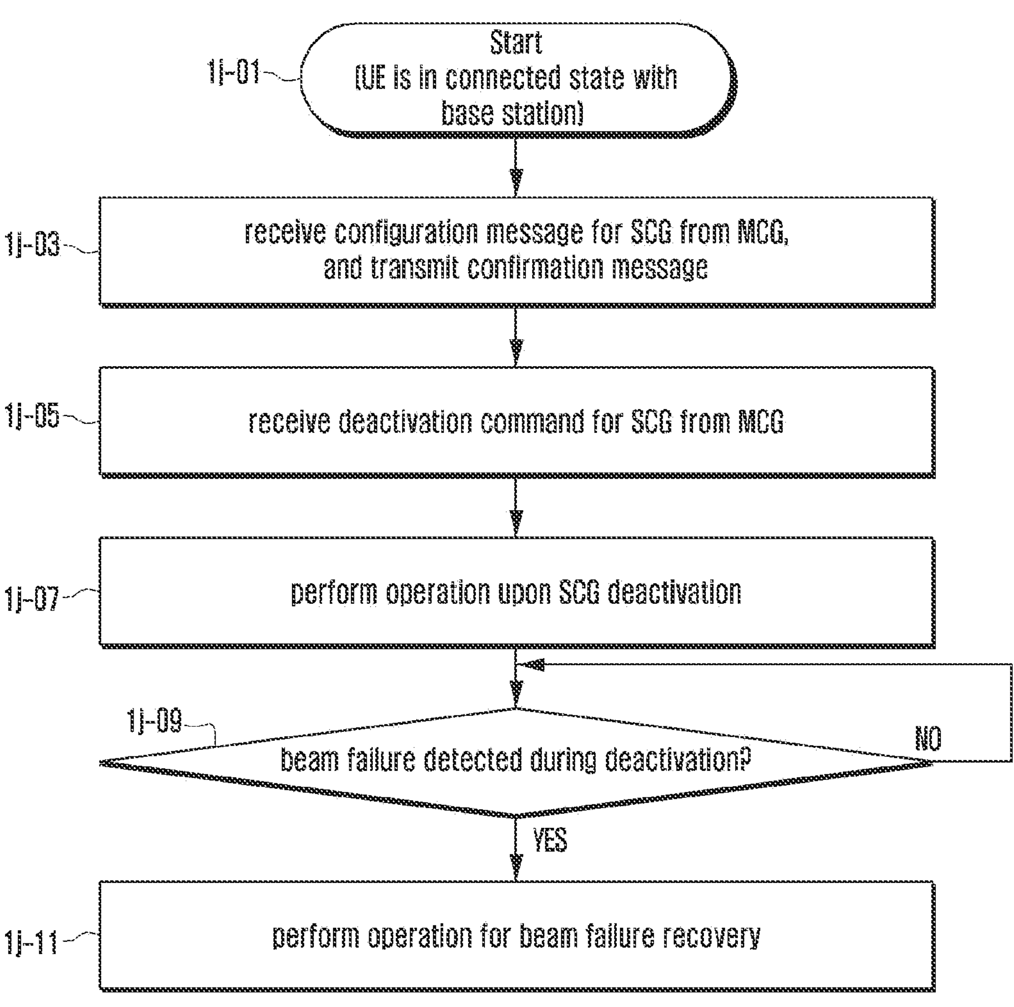
FIG. 1J is an illustrative diagram for a sequence of UE operations when the UE performs beam failure detection and recovery of a PSCell in a state where the configured SCG is deactivated.

FIG. 1J is an illustrative diagram for a sequence of UE operations when the UE performs beam failure detection and recovery of a PSCell (primary secondary cell) in a state where the configured SCG (secondary cell group) is deactivated.

In FIG. 1J, it is assumed that the UE is connected to the base station (master cell group (MCG)) and is in connected mode (RRC_CONNECTED) enabling data communication (1*j*-01). Thereafter, the UE receives configuration information for adding an SCG including the aforementioned PSCell from the MCG, and transmits a confirmation message for this to the MCG (1*j*-03). The configuration information transmitted by the MCG may be received by being included in a RRCReconfiguration message of the RRC layer, and the confirmation message transmitted by the UE may be transmitted by being included in a RRCReconfigurationComplete message of the RRC layer. The configuration information may include at least one of TA-related configuration information of the PSCell, parameters related to beam failure detection (BFD), or parameters related to beam failure recovery (BFR). The UE having received the configuration information may perform random access to the configured PSCell to utilize the PSCell.

Accordingly, both the MCG and the SCG are activated, and the UE is in a state where data can be transmitted and received through two base stations. Also, since the UE has performed random access to the PSCell, it can transmit uplink data through serving cells belonging to the corresponding TAG (timing advance group) while the TAT (time alignment timer) of the TAG to which the PSCell belongs is running. In addition, before or after the expiration of the TAT of the primary timing advance group (PTAG) of the SCG, the base station may transmit a physical downlink control channel (PDCCH) order to the UE. The PDCCH order may be a PDCCH instructing to start random access. The UE having received the PDCCH order may receive a new TA value in a random access process and (re) start the TAT.

Meanwhile, the UE may receive a command to deactivate the currently active SCG from the MCG (1*j*-05). This can be determined by the MCG or SCG base station according to the amount of data transmitted through the SCG or the like. This deactivation command may be received as an RRC message of the radio resource control (RRC) layer, or may be received through a MAC control element (CE) being a control message of the medium access control (MAC) layer, or through the PDCCH. Upon receiving this, the UE may transmit, to the MCG, a message confirming that the corresponding command has been received. This confirmation message may be transmitted as an RRC message of the RRC layer, or may be transmitted through a MAC control element (CE) being a control message of the MAC layer, or through HARQ feedback. Consequently, the UE may deactivate the corresponding SCG and stop data transmission and reception in the corresponding SCG (1*j*-07), thereby reducing power consumption due to communication with the corresponding SCG.

On the other hand, even after receiving the deactivation command, the UE may continuously measure a signal for the PSCell. This is to resume data communication immediately when the SCG is activated again later. Accordingly, the UE may detect an above-described BFD, in which the signal of a beam transmitted by the PSCell is lost, in a state where the SCG is deactivated, that is, in a state where the PSCell is deactivated (1*j*-09). If the UE detects a BFD of the PSCell, it may perform one of the following operations (1*j*-11).

A first option is a method in which the UE performs random access to the PSCell for BFR of the corresponding PSCell. Here, the UE may perform contention free random access (CFRA) by using a random access resource, previously configured by the MCG or SCG, allocated exclusively for BFR upon BFD of the SCG PSCell. Alternatively, if there is no such dedicated resource, or if the dedicated resource is not available although being allocated (e.g., when the signal strength of the selected beam is less than a preset threshold), the UE may perform contention based random access (CBRA). When performing contention based random access, the UE transmits a C-RNTI MAC CE including the C-RNTI used in the SCG in the previous active state via Msg3 or MsgA. As a result, when the UE successfully completes random access, the SCG can also know the beam position (synchronization signal block (SSB)) of the corresponding UE, and the UE still leaves the corresponding SCG in inactive state.

A second option is a method in which the UE informs the MCG that a BFR of the corresponding PSCell has occurred. To this end, the UE may inform the MCG that a BFR of the SCG has occurred by using a new BFR MAC CE. Further, the UE may additionally include information on candidate beams usable for the PSCell in the BFR MAC CE and transmit it to the MCG, and the information transmitted through the BFR MAC CE may be delivered to the SCG.

By using one of the above options, the UE continues to maintain the beam information used in inactive state, so that downlink transmission delay can be reduced upon activation.

On the other hand, the above options have the advantage of being able to immediately recover a beam failure, but have a burden that the UE must continuously measure the signal strength of the deactivated PSCell. Hence, as another option, it may be considered that when the SCG is deactivated, BFD is not performed, but after receiving an SCG activation command, the UE reports detailed beam information upon PSCell activation. For example, when there are multiple SCG beams, SSB information selected by the UE during random access alone may be insufficient for communication with the corresponding UE. To this end, when the MCG transmits an SCG activation command, the SCG may transmit a separate reference signal (channel state information-reference signal (CSI-RS)) for temporary channel measurement in an intensive and temporary manner (temporary RS); in this case, the UE may additionally measure the CSI-RS as well as the SSB during or before random access, and thus may include one or plural pieces of CSI-RS measurement information in Msg3 or MsgA and transmit it to the SCG during random access. Based on the above information, data communication with the SCG (PSCell) can be rapidly resumed.

Figure 1K:
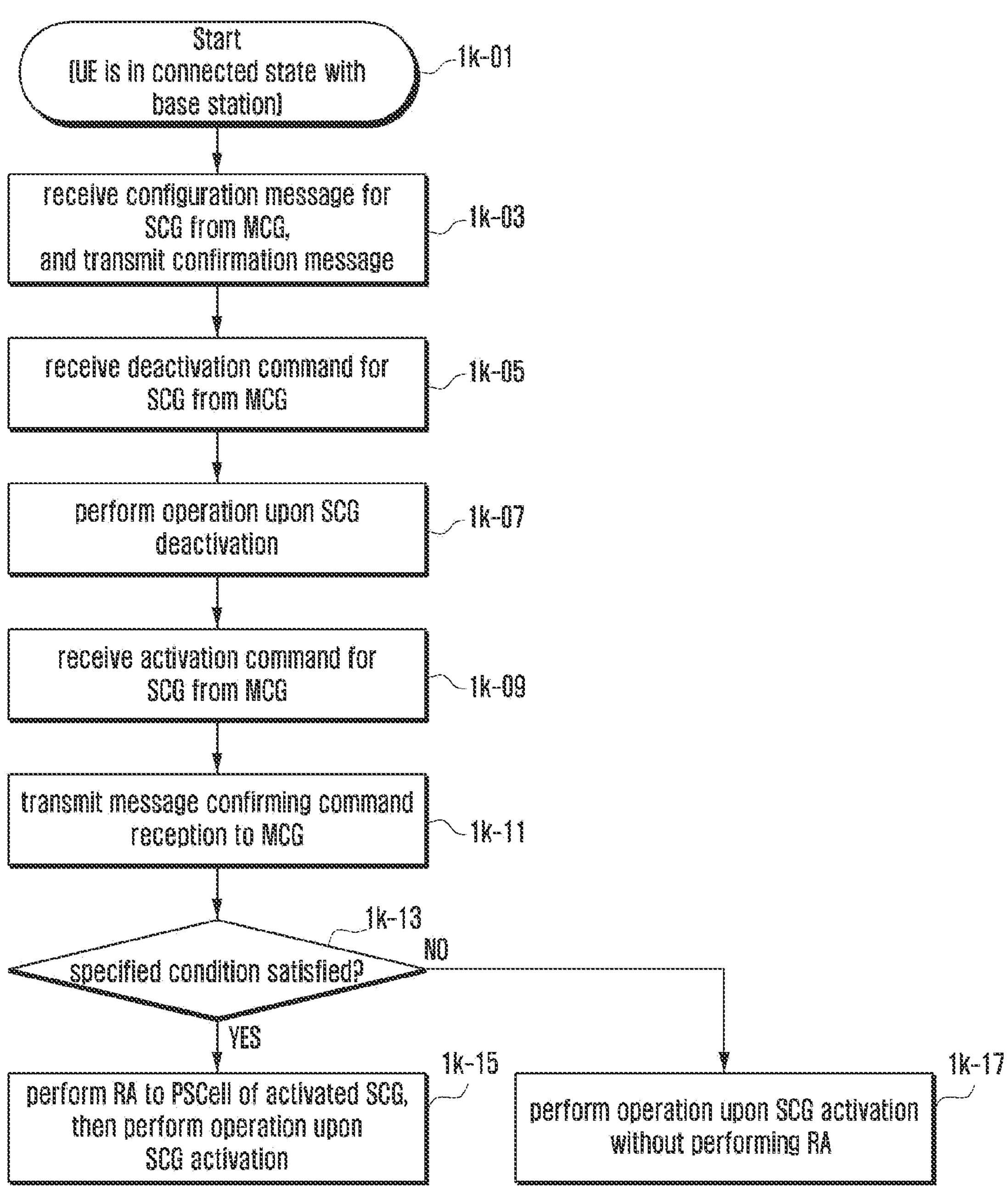
FIG. 1K is a first illustrative diagram of a sequence of UE operations when the UE activates the SCG again in a state where the configured SCG is deactivated.

FIG. 1K is a first illustrative diagram of a sequence of UE operations when the UE activates the SCG again in a state where the configured SCG is deactivated.

In FIG. 1K, it is assumed that the UE is connected to the base station (MCG) and is in connected mode (RRC_CONNECTED) enabling data communication (1*k*-01). Thereafter, the UE receives configuration information for adding an SCG including the aforementioned PSCell from the MCG, and transmits a confirmation message for this to the MCG (1*k*-03). The configuration information transmitted by the MCG may be received by being included in a RRCReconfiguration message of the RRC layer, and the confirmation message transmitted by the UE may be transmitted by being included in a RRCReconfigurationComplete message of the RRC layer. The configuration information may include at least one of TA-related configuration information of the PSCell, parameters related to beam failure detection (BFD), or parameters related to beam failure recovery (BFR). The UE having received the configuration information may perform random access to the configured PSCell to utilize the PSCell.

Accordingly, both the MCG and the SCG are activated, and the UE is in a state where data can be transmitted and received through two base stations. Also, since the UE has performed random access to the PSCell, it can transmit uplink data through serving cells belonging to the corresponding TAG while the TAT of the TAG to which the PSCell belongs is running. In addition, before or after the expiration of the TAT of the PTAG of the SCG, the base station may transmit a PDCCH order to the UE. The PDCCH order may be a PDCCH instructing the UE to start random access. The UE having received the PDCCH order may receive a new TA value in a random access process and (re) start the TAT.

Meanwhile, the UE may receive a command to deactivate the currently active SCG from the MCG (1*k*-05). This can be determined by the MCG or SCG base station according to the amount of data transmitted through the SCG or the like. This deactivation command may be received by being included in an RRC message of the RRC layer, by being included in a MAC control element (CE) being a control message of the MAC layer, or by being included in the PDCCH. Upon receiving the deactivation command, the UE may transmit, to the MCG, a message confirming that the corresponding command has been received. This confirmation message may be transmitted by being included in an RRC message of the RRC layer, by being included in a MAC control element (CE) being a control message of the MAC layer, or by being included in HARQ feedback. Consequently, the UE may deactivate the corresponding SCG and stop data transmission and reception in the corresponding SCG (1k-07), thereby reducing power consumption due to communication with the corresponding SCG.

Thereafter, due to an increase in the amount of data to be transmitted via the SCG or the like, the UE may receive a command to activate the currently deactivated SCG from the MCG (1k-09). This activation command may be received as an RRC message of the RRC layer, or may be received through a MAC control element (CE) being a control message of the MAC layer or through the PDCCH. Upon receiving this, the UE may transmit, to the MCG, a confirmation message notifying that the corresponding command has been received (1k-11). This confirmation message may be transmitted as an RRC message of the RRC layer, or may be transmitted through a MAC control element (CE) being a control message of the MAC layer or through HARQ feedback.

Meanwhile, for TA of the PSCell and beam selection, there is a case where the UE needs to perform random access to the PSCell (1k-15), and there is a case where it is not necessary to perform random access thereto (1k-17).

That is, if one of the following conditions is satisfied, the UE performs random access to the PSCell.

A first condition is when the TAT of the PSCell has expired. In this case, as uplink transmission of SCells including the PSCell utilizing the same TAG as the PSCell cannot be performed, random access is required.

A second condition is when the PSCell uses multiple beams. That is, this is a case where multiple SSB or transmission configuration indication (TCI) states are configured for the UE. This is because, when the PSCell is deactivated, the UE may be moved and there is a possibility that the UE may no longer communicate using a previously used beam. As described above, when random access is performed, as the UE selects a specific SSB and transmits a preamble over a corresponding resource, the base station can know which SSB the UE is positioned at.

As a third condition, when, after the SCG is deactivated, the signal strength of the beam used at the time of deactivation changes more than a threshold set previously through the MCG or SCG (i.e., weakens), the UE performs random access. Under this condition, like the second condition, after the PSCell of the UE is deactivated, the strength of the last used beam has weakened, which indicates that there is a possibility that the UE and the PSCell can no longer communicate using the previously used beam.

As a fourth condition, when, after the SCG is deactivated, the SCG activated upon receiving a SCG change (i.e., PSCell change) configuration from the MCG is different from the previously deactivated SCG, the UE performs random access. In this case, for the TA and beam selection of a newly configured PSCell, the UE should perform random access to the PSCell.

If any of the above conditions is applicable (1k-13), the UE performs a random access procedure to the PSCell of the activated SCG to resume data communication with the SCG (1k-15); if there is no applicable condition, the UE resumes data communication with the SCG without performing a random access procedure to the PSCell (1k-17). Through the above procedure, the UE can resume communication by obtaining TA and beam information of the activated PSCell.

Figure 1L:
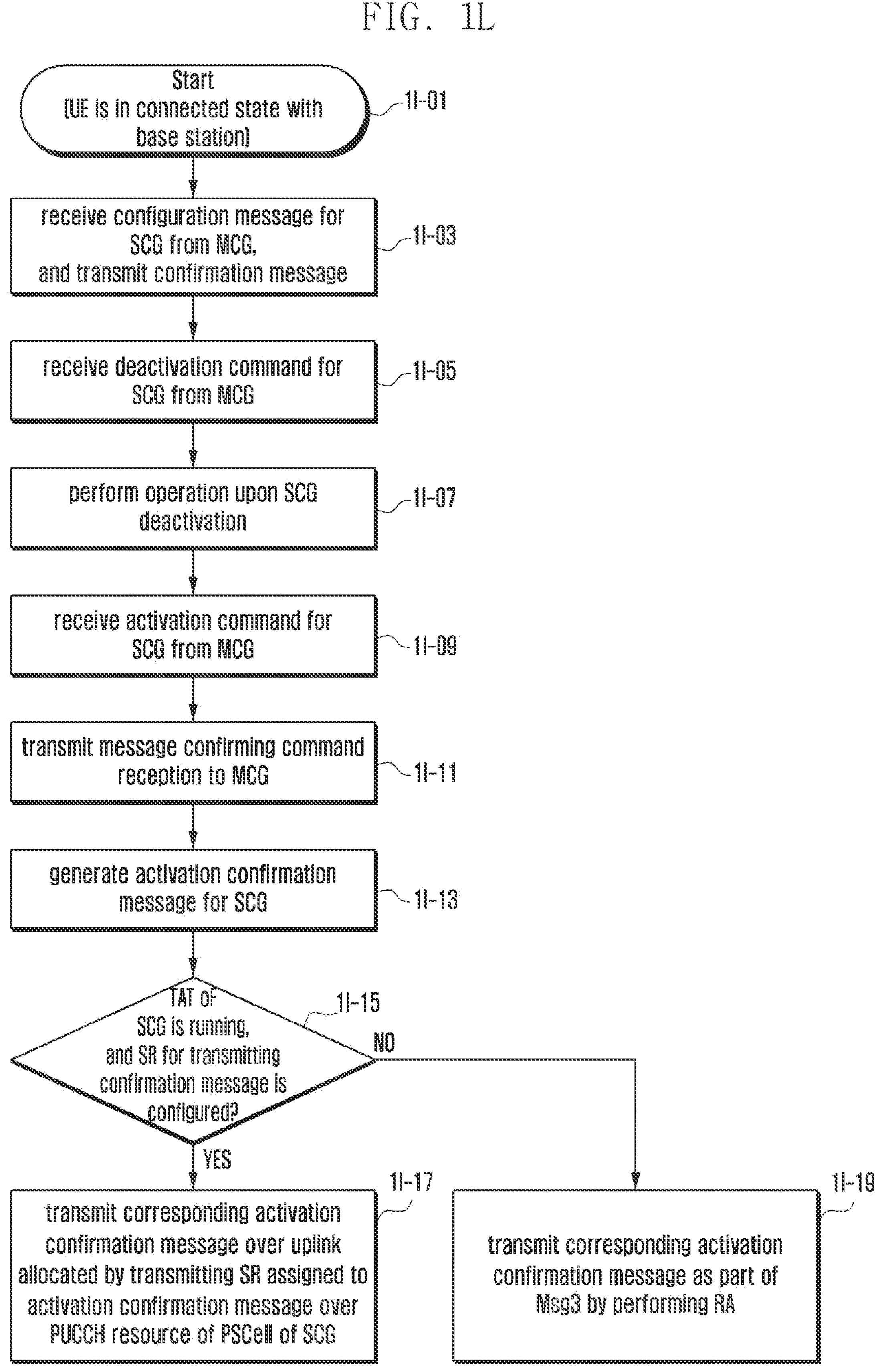
FIG. 1L is a second illustrative diagram of a sequence of UE operations when the UE activates the SCG again in a state where the configured SCG is deactivated.

FIG. 1L is a second illustrative diagram of a sequence of UE operations when the UE activates the SCG again in a state where the configured SCG is deactivated.

In FIG. 1L, it is assumed that the UE is connected to the base station (MCG) and is in connected mode (RRC_CONNECTED) enabling data communication (1l-01). Thereafter, the UE receives configuration information for adding an SCG including the aforementioned PSCell from the MCG, and transmits a confirmation message for this to the MCG (1l-03). The configuration information transmitted by the MCG may be received by using a RRCReconfiguration message of the RRC layer, and the confirmation message transmitted by the UE may be transmitted by using a RRCReconfigurationComplete message of the RRC layer. The configuration information may include at least one of TA-related configuration information of the PSCell, parameters related to beam failure detection (BFD), or parameters related to beam failure recovery (BFR). The UE having received the configuration information may perform random access to the configured PSCell to utilize the PSCell.

Accordingly, both the MCG and the SCG are activated, and the UE is in a state where data can be transmitted and received through two base stations. Also, since the UE has performed random access to the PSCell, it can transmit uplink data through serving cells belonging to the corresponding TAG while the TAT of the TAG to which the PSCell belongs is running. In addition, before or after the expiration of the TAT of the PTAG of the SCG, the base station may transmit a PDCCH order to the UE. The PDCCH order may be a PDCCH instructing the UE to start random access. The UE having received the PDCCH order may receive a new TA value in a random access process and (re) start the TAT.

Meanwhile, the UE may receive a command to deactivate the currently active SCG from the MCG (1l-05). This can be determined by the MCG or SCG base station according to the amount of data transmitted through the SCG or the like. This deactivation command may be received as an RRC message of the RRC layer, or may be received through a MAC control element (CE) being a control message of the MAC layer, or through the PDCCH. Upon receiving this, the UE may transmit, to the MCG, a message confirming that the corresponding command has been received. This confirmation message may be transmitted as an RRC message of the RRC layer, or may be transmitted through a MAC control element (CE) being a control message of the MAC layer, or through HARQ feedback. Consequently, the UE may deactivate the corresponding SCG and stop data transmission and reception in the corresponding SCG (1l-07), thereby reducing power consumption due to communication with the corresponding SCG.

Thereafter, due to an increase in the amount of data to be transmitted via the SCG or the like, the UE may receive a command to activate the currently deactivated SCG from the MCG (1l-09). This activation command may be received by being included in an RRC message of the RRC layer, by being included in a MAC control element (CE) being a control message of the MAC layer, or by being included in the PDCCH. Upon receiving this, the UE may transmit, to the MCG, a confirmation message notifying that the activation command has been received (1l-11). This confirmation message may be transmitted by being included in an RRC message of the RRC layer, by being included in a MAC control element (CE) being a control message of the MAC layer, or by being included in HARQ feedback.

In addition, the UE generates a message for transmitting a separate activation confirmation message to the SCG to notify that it is ready for data communication with the SCG (1l-13). This activation confirmation message may be generated as an RRC message of the RRC layer or may be generated as a MAC control element (CE) being a control message of the MAC layer. Further, for the purpose of an activation confirmation message, the previously used C-RNTI MAC CE may be used; alternatively, although the format is the same as the C-RNTI MAC CE, it may be transmitted by using a separate logical channel identifier (LCID) to separately notify that the corresponding UE is ready to activate the SCG.

Then, to transmit the generated message, the UE determines whether the TAT of the TAG to which the PSCell having received the activation command belongs is running (**1*l*-15). If the TAT of the TAG to which the PSCell having received the activation command belongs is running, the UE transmits a scheduling request (SR) to the base station through the PUCCH of the PSCell for the activation confirmation message. Accordingly, when the UE is allocated an uplink resource by the base station, it transmits the generated activation confirmation message over the corresponding resource (1*l*-17). The SR resource used in the above procedure is configured in advance from the MCG or SCG before the corresponding SCG is deactivated. If the corresponding SR resource is not configured from the base station, or if the TAT of the TAG to which the PSCell having received the activation command belongs is not running, the UE transmits Msg3 or MsgA including the generated activation confirmation message to the SCG by performing a random access procedure (1*l*-19**). Through the above procedure, the UE can directly notify the SCG that data communication is ready in the activated PSCell, and can resume communication.

Figure 1M:
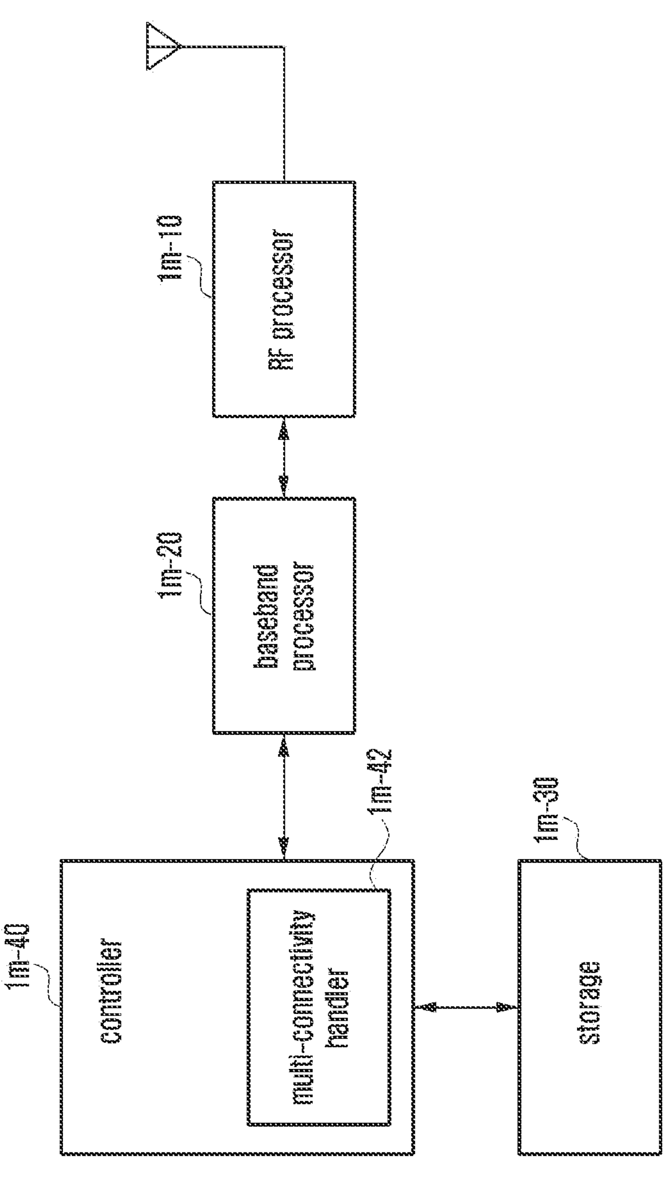
FIG. 1M illustrates the configuration of a UE according to an embodiment of the disclosure.

FIG. 1M illustrates a block configuration of a UE according to an embodiment of the disclosure.

With reference to FIG. 1M, the UE may include a radio frequency (RF) processor **1*m*-10, a baseband processor 1*m*-20, a storage 1*m*-30, and a controller 1*m*-40**.

The RF processor **1*m*-10 performs a function for transmitting and receiving a signal through a radio channel, such as signal band conversion and amplification. That is, the RF processor 1*m*-10 performs up-conversion of a baseband signal provided from the baseband processor 1*m*-20 into an RF-band signal and transmits it through an antenna, and performs down-conversion of an RF-band signal received through an antenna into a baseband signal. For example, the RF processor 1*m*-10 may include a transmission filter, a reception filter, an amplifier, a mixer, an oscillator, a digital-to-analog converter (DAC), and an analog-to-digital converter (ADC). Although only one antenna is illustrated in FIG. 1M, the UE may be provided with a plurality of antennas. Also, the RF processor 1*m*-10 may include a plurality of RF chains. Further, the RF processor 1*m*-10 may perform beamforming. For beamforming, the RF processor 1*m*-10** may adjust phases and magnitudes of signals transmitted and received through the plural antennas or antenna elements.

The baseband processor **1*m*-20 performs conversion between a baseband signal and a bit stream in accordance with the physical layer specification of the system. For example, during data transmission, the baseband processor 1*m*-20 generates complex symbols by encoding and modulating a transmission bit stream. Further, during data reception, the baseband processor 1*m*-20 restores a reception bit stream by demodulating and decoding a baseband signal provided from the RF processor 1*m*-10. For example, in the case of utilizing orthogonal frequency division multiplexing (OFDM), for data transmission, the baseband processor 1*m*-20 generates complex symbols by encoding and modulating a transmission bit stream, maps the complex symbols to subcarriers, and composes OFDM symbols through inverse fast Fourier transform (IFFT) operation and cyclic prefix (CP) insertion. Further, for data reception, the baseband processor 1*m*-20 divides a baseband signal provided from the RF processor 1*m*-10** in units of OFDM symbols, restores the signals mapped to subcarriers through fast Fourier transform (FFT) operation, and restores the reception bit stream through demodulation and decoding.

The baseband processor **1*m*-20 and the RF processor 1*m*-10 transmit and receive signals as described above. Hence, the baseband processor 1*m*-20 and the RF processor 1*m*-10 may be called a transmitter, a receiver, a transceiver, or a communication unit. Further, to process signals of different frequency bands, at least one of the baseband processor 1*m*-20 or the RF processor 1*m*-10** may include different communication modules. The different frequency bands may include a super high frequency (SHF) band (e.g., 2.5 GHZ, 5 GHZ) and a millimeter wave (mmWave) band (e.g., 60 GHz).

The storage **1*m*-30** stores data such as basic programs, application programs, and configuration information for the operation of the UE.

The controller **1*m*-40 controls the overall operation of the UE. For example, the controller 1*m*-40 transmits and receives signals through the baseband processor 1*m*-20 and the RF processor 1*m*-10. Further, the controller 1*m*-40 writes or reads data to or from the storage 1*m*-40. To this end, the controller 1*m*-40 may include at least one processor. For example, the controller 1*m*-40 may include a communication processor (CP) for controlling communication and an application processor (AP) for controlling higher layers such as application programs. According to an embodiment of the disclosure, the controller 1*m*-40 includes a multi-connectivity handler 1*m*-42 that performs processing for operations in multi-connectivity mode. For example, the controller 1*m*-40 may control the UE to perform the procedure illustrated in the UE operation shown in FIG. 1**M.

According to an embodiment of the disclosure, the UE can manage the TA or detect and recover a beam failure while the SCG is deactivated, so that it can reduce delay when the SCG is activated later by having valid uplink timing and managing valid beams. In addition, when activating the SCG, the UE directly informs that it is ready to communicate with the SCG, enabling the SCG to explicitly determine the time point for data transmission and reception.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium may be configured to be executable by one or more processors of an electronic device. The one or more programs may include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

On the other hand, although specific embodiments have been described in the detailed description of the disclosure, various modifications are possible without departing from the scope of the disclosure. Therefore, the scope of the disclosure should not be limited to the described embodiments but should be determined by both the claims described below and their equivalents.

The embodiments of the disclosure disclosed in the present specification and drawings are provided as specific examples to easily explain the technical contents of the disclosure and help understanding of the disclosure, and are not intended to limit the scope of the disclosure. It will be apparent to those of ordinary skill in the art to which the disclosure pertains that other modifications can be carried out based on the technical spirit of the disclosure in addition to the embodiments disclosed herein.

What is claimed is:

1. A method performed by a user equipment (UE) in a wireless communication system, the method comprising:

receiving, from a first base station associated with a master cell group (MCG), a first radio resource control (RRC) reconfiguration message including configuration information for configuring a secondary cell group (SCG) associated with a second base station;

receiving, from the first base station, a second RRC message for deactivating the SCG;

based on the second RRC message for deactivating the SCG, performing an SCG deactivation;

detecting a beam failure on a primary secondary cell (PSCell) of the SCG while the SCG is deactivated; and transmitting, to the first base station, a beam failure recovery (BFR) media access control (MAC) control element (CE) for informing the detection of the beam failure on the PSCell of the SCG, wherein the BFR MAC CE includes information on a candidate beam for the PSCell, and wherein the UE keeps running a time alignment timer (TAT) of a primary timing advance group (PTAG) that the PSCell belongs to while the SCG is deactivated.

2. The method of claim 1, further comprising:

based on the reception of the second RRC message for deactivating the SCG, transmitting, to the first base station, a confirmation message confirming that the second RRC message is received.

3. The method of claim 1, wherein the configuration information includes counter information for detecting the beam failure, and wherein the beam failure is detected, in case that a counter for beam failure instance indication is equal to or larger than the counter information.

4. The method of claim 1, wherein the configuration information includes at least one of first information associated with a timing advance (TA) or second information on beam failure recovery.

5. A method performed by a first base station associated with a master cell group (MCG) in a wireless communication system, the method comprising:

transmitting, to a user equipment (UE), a first radio resource control (RRC) reconfiguration message including configuration information for configuring a secondary cell group (SCG) associated with a second base station;

transmitting, to the UE, a second RRC message for deactivating the SCG; and receiving, from the UE, a beam failure recovery (BFR) media access control (MAC) control element (CE) for informing a detection of a beam failure on a primary secondary cell (PSCell) of the SCG, in case that the beam failure on (the PSCell) of a deactivated state of the SCG is detected, wherein the BFR MAC CE includes information on a candidate beam for the PSCell, and wherein a time alignment timer (TAT) of a primary timing advance group (PTAG) that the PSCell belongs to is running while the SCG is deactivated.

6. The method of claim 5, further comprising:

receiving, from the UE, a confirmation message confirming that the second RRC message is received, as a response to the second RRC message for deactivating the SCG.

7. The method of claim 5, wherein the configuration information includes counter information for detecting the beam failure, and wherein the beam failure is detected, in case that a counter for beam failure instance indication is equal to or larger than the counter information.

8. The method of claim 5, wherein the configuration information includes at least one of first information associated with a timing advance (TA) or second information on beam failure recovery.

9. A user equipment (UE) in a wireless communication system, the UE comprising:

a transceiver; and a controller coupled with the transceiver and configured to:

receive, from a first base station associated with a master cell group (MCG), a first radio resource control (RRC) reconfiguration message including configuration information for configuring a secondary cell group (SCG) associated with a second base station, receive, from the first base station, a second RRC message for deactivating the SCG, based on the second RRC message for deactivating the SCG, perform an SCG deactivation, detect a beam failure on a primary secondary cell (PSCell) of the SCG while the SCG is deactivated, and transmit, to the first base station, a beam failure recovery (BFR) media access control (MAC) control element (CE) for informing the detection of the beam failure on the PSCell of the SCG, wherein the BFR MAC CE includes information on a candidate beam for the PSCell, and wherein the UE keeps running a time alignment timer (TAT) of a primary timing advance group (PTAG) that the PSCell belongs to while the SCG is deactivated.

10. The UE of claim 9, wherein the controller is further configured to:

based on the reception of the second RRC message for deactivating the SCG, transmit, to the first base station, a confirmation message confirming that the second RRC message is received.

11. The UE of claim 9, wherein the configuration information includes counter information for detecting the beam failure, and wherein the beam failure is detected, in case that a counter for beam failure instance indication is equal to or larger than the counter information.

12. The UE of claim 9, wherein the configuration information includes at least one of first information associated with a timing advance (TA) or second information on beam failure recovery.

13. A first base station associated with a master cell group (MCG) in a wireless communication system, the first base station comprising:

a transceiver; and a controller coupled with the transceiver and configured to:

transmit, to a user equipment (UE), a first radio resource control (RRC) reconfiguration message including configuration information for configuring a secondary cell group (SCG) associated with a second base station, transmit, to the UE, a second RRC message for deactivating the SCG, and receive, from the UE, a beam failure recovery (BFR) media access control (MAC) control element (CE) for informing a detection of a beam failure on a primary secondary cell (PSCell) of the SCG, in case that the beam failure on the PSCell of a deactivated state of the SCG is detected, wherein the BFR MAC CE includes information on a candidate beam for the PSCell, and wherein a time alignment timer (TAT) of a primary timing advance group (PTAG) that the PSCell belongs to is running while the SCG is deactivated.

14. The first base station of claim 13, wherein the controller is further configured to:

receive, from the UE, a confirmation message confirming that the second RRC message is received, as a response to the second RRC message for deactivating the SCG.

15. The first base station of claim 13, wherein the configuration information includes counter information for detecting the beam failure, and wherein the beam failure is detected, in case that a counter for beam failure instance indication is equal to or larger than the counter information.

16. The first base station of claim 13, wherein the configuration information includes at least one of first information associated with a timing advance (TA) or second information on beam failure recovery.

* * * * *